United States Patent [19] | [11] Patent Number: 4,700,390
Machida | [45] Date of Patent: Oct. 13, 1987

[54] SIGNAL SYNTHESIZER

[76] Inventor: Kenji Machida, 2-3-3, Nishiogiminami, Suginami-ku, Tokyo, Japan

[21] Appl. No.: 588,799

[22] Filed: Mar. 12, 1984

[30] Foreign Application Priority Data

| | | | |
|---|---|---|---|
| Mar. 17, 1983 | [JP] | Japan | 58-45193 |
| Oct. 12, 1983 | [JP] | Japan | 58-190331 |
| Jan. 12, 1984 | [JP] | Japan | 59-2666 |

[51] Int. Cl.[4] .......................... G01L 5/00; G10H 3/00

[52] U.S. Cl. ........................................ 381/29; 381/61; 381/28; 84/1.01; 84/1.24; 84/1.26

[58] Field of Search .................................... 381/29–33, 381/61, 54, 98, 1; 375/122; 364/514; 455/43, 313, 39, 70, 72; 328/14–17, 20, 22, 23, 24; 360/24, 25; 369/60, 88

[56] References Cited

U.S. PATENT DOCUMENTS

| | | | |
|---|---|---|---|
| 2,542,594 | 2/1951 | Tiffany | 455/39 |
| 2,866,849 | 4/1955 | Lindridge | 381/98 |
| 3,349,184 | 10/1967 | Morgan | 381/29 |
| 3,681,618 | 8/1972 | Blackmer | 307/229 |
| 3,725,800 | 4/1973 | Papay . | |
| 3,781,488 | 12/1973 | Byers | 360/24 |
| 3,828,133 | 8/1974 | Ishigami et al. | 381/30 |
| 3,921,092 | 11/1975 | Schatz . | |
| 4,182,930 | 1/1980 | Blackmer | 381/28 |
| 4,193,332 | 3/1980 | Richardson | 84/1.26 |
| 4,314,104 | 2/1982 | Harris et al. | 455/39 |
| 4,399,326 | 8/1983 | Bode | 381/101 |

OTHER PUBLICATIONS

"Modern Electronics Circuit Reference Manual", (partial copy—3 pages), McGraw-Hill Book Company (no date).

dbx Model 100, "Boom Box" Sub Harmonic Synthesizer-Instruction Manual, cover page (no date).

*Primary Examiner*—E. S. Matt Kemeny
*Attorney, Agent, or Firm*—Frishauf, Holtz, Goodman & Woodward

[57] ABSTRACT

To enhance low and high frequency components in a sound signal, low frequency components are used to generate new yet lower frequencies (subharmonics), and high frequency components are used to generate new yet higher frequencies (harmonics), the new frequencies added to the original signal thereby increasing the original signal bandwidth.

8 Claims, 32 Drawing Figures

SIGNAL SYNTHESIZER

BACKGROUND OF THE INVENTION

This invention relates to a signal synthesizer in which a wide frequency range signal is synthesized from a narrow frequency range signal.

There are many signal transmission systems in which a wide frequency range signal transmission is hard to obtain. Typical examples are an AM radio broadcasting system, analog tape recorder with slow tape running speed, telephone network, etc. When a superheterodyne AM receiver is considered, even if AM broadcasting stations transmit a wide frequency range musical source, the sound quality of music reproduced from the AM receiver is very poor because the reproduced sound lacks overtone or higher harmonic frequency components. A conventional high-frequency enhancing tone controller (or equalizer) may somewhat improve the sound quality, but frequency compensation by means of such a tone controller inevitably invites increase of noise. Further, although a tone controller or tone equalizer can compensate the level down of signal components, it cannot compensate nonexistent or excessively level-downed signal components.

SUMMARY OF THE INVENTION

It is accordingly an object of the present invention to provide a signal synthesizer which can synthesize a wide frequency range signal from a narrow frequency range signal based on a new concept different from a conventional tone controller or conventional frequency equalizer.

To achieve the above object a signal synthesizer of the invention utilizes the following exemplified process:

(1) Extracting the signal components of 4 kHz to 8 kHz from a narrow range input signal (50 Hz–8 kHz);

(2) Frequency-doubling the extracted components (4 kHz–8 kHz) in a manner that the amplitude of the frequency-doubled components (8 kHz–16 kHz) corresponds to that of the extracted components (4kHz–8 kHz); and (3) Combining or mixing the frequency-doubled components (8 kHz–16 kHz) with the input signal (50 Hz–8 kHz) to obtain a wide range output signal (50 Hz–16 kHz).

According to the above example of this invention, a frequency compensation of 8 kHz to 16 kHz without high-frequency enhancing equalization is possible. Further, even if the input signal completely lacks the components of 8 kHz to 16 kHz, the output signal may contain the components of 8 kHz to 16 kHz. Furthermore, since synthesized signals (8 kHz–16 kHz) are lower-order (second-order) higher harmonics of the original signal (4 kHz–8 kHz), a uncomfortable distorted sound can be substantially avoided. These are unique and important features obtained from the present invention.

DETAILED DESCRIPTION OF THE PREFERRED EMBODIMENT

Figure 1:
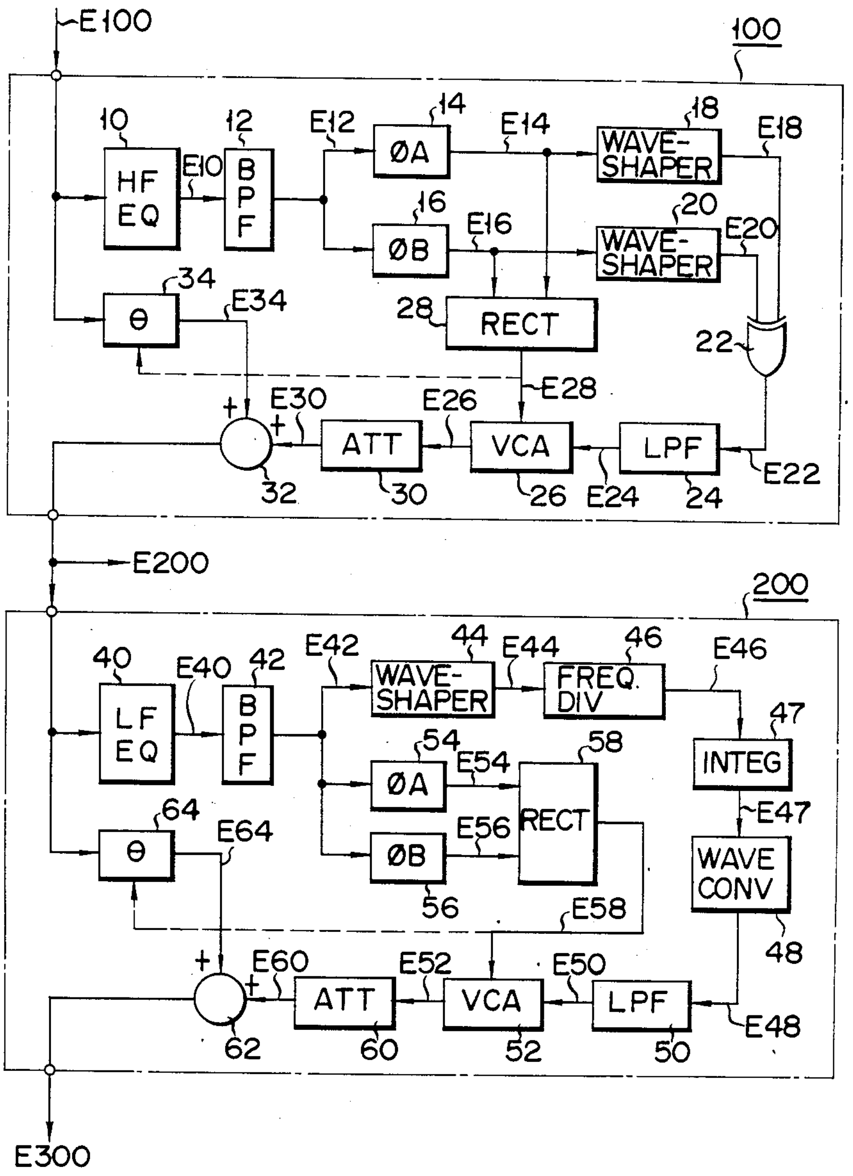
FIG. 1 shows a block configuration of a signal synthesizer which is one embodiment of the invention.

FIG. 1 shows an embodiment of a signal synthesizer according to the present invention. In the embodiment of FIG. 1 the frequency range of an input signal E100 is expanded toward the higher frequency side and toward the lower frequency side.

E100 is supplied to a high frequency equalizer (HFEQ) 10. Suppose that the −3 dB band width of E100 is 100 Hz to 4 kHz, and that the response decrement slope of E100 between 50 Hz to 8 kHz is −6 dB/oct. In this case HFEQ 10 compensates the decrement of E100 for 4 kHz to 8 kHz. HFEQ 10 may be omitted from this embodiment as the case may be. An output signal E10 from HFEQ 10 is supplied to a band-pass filter (BPF) 12. Signal components of 4 kHz to 8 kHz are extracted from E10 by BPF 12. BPF 12 may be replaced by a high-pass filter having a cut-off frequency of about 4 kHz.

An output signal E12 from BPF 12 is supplied to phase shifters 14 and 16. Phase shifters 14 and 16 have respective time constants for proper phase shifting. By this phase shifting an output signal E14 of shifter 14 is phase-deviated by about 90 degrees from an output signal E16 of shifter 16 within the frequency range of 4 kHz to 8 kHz. The phase deviation between E14 and E16 is illustrated in FIGS. 2*a* and 2*b*.

E14 and E16 are respectively supplied to waveshapers 18 and 20 having zero-input threshold levels. Zero-cross sensors may be used for these waveshapers. Waveshaper 18 provides a rectangular signal E18 being in-phase with E14 (FIGS. 2*a* and 2*d*), and waveshaper 20 provides a rectangular signal E20 being in-phase with E16 (FIGS. 2*b* and 2*e*). E18 and E20 are inputted to an exclusive OR gate (EXOR) 22. EXOR 22 outputs a signal E22 having a high level at which the level of E18 differs from the level of E20 (FIGS. 2*d*–2*f*). The frequency of E22 is the double of the frequency of E18 and E20. Thus, when the frequency components of E12 and 4 kHz to 8 kHz, the frequency components of E22 are 8 kHz to 16 kHz. Although E22 may contain higher frequency components of more than 16 kHz, such components are attenuated or eliminated by a low-pass filter (LPF) 24. This filter 24 may be a BPF. Since the harmonics of 8 kHz or more are barely audible, LPF 24 may be omitted in practice. When the higher harmonic components are eliminated by LPF 24, the waveform of an output signal E24 from LPF 24 becomes nearly a sine waveform (FIG. 2*g*).

E24 is supplied to a voltage controlled amplifier or voltage controlled attenuator (VCA) 26. The amplification factor or attenuation degree of VCA 26 is controlled by the potential of a control signal E28. E28 is obtained from a rectifier 28. In rectifier 28 the sum of the square of E14 and E16 is detected and this sum ($E14^2+E16^2$) is used for E28. When E14=E sin wt, since E14 and E16 have a phase difference of 90 degrees, E16=E cos wt. Then, the sum (E28) is:

$$E28=E14^2+E16^2=E^2\sin^2 wt+E^2\cos^2 wt=E^2$$

The above equation indicates that E28 is independent of the angular frequency w of E14 and E16. That is, E28 is a DC signal having a potential proportional to the amplitude of E14 or E16 (FIGS. 2*a*–2*c*). In VCA 26, E24 having a frequency twice that of E12 is amplitude-modulated according to the potential of E28.

How the amplitude-modulation in VCA 26 is performed is illustrated in FIGS. 2*c*, 2*g* and 2*h*. When E12 has a medium amplitude, each of E14 and E16 also has a medium amplitude and the potential of E28 becomes L1 (before t10 in FIGS. 2*a*, 2*b* and 2*c*). Thus, the amplitude of E26 becomes medium (FIG. 2*h*). When the amplitude of E12 becomes large, each amplitude of E14 and E16 also becomes large and the potential of E28 rises to L2 (between t10 and t20 in FIGS. 2*a*, 2*b* and 2*c*). Thus, the amplitude of E26 becomes large (FIG. 2*h*). When the amplitude of E12 becomes small, each amplitude of E14 and E16 also becomes small and the potential of E28 falls to L3 (after t20 in FIGS. 2*a*, 2*b* and 2*c*). Accordingly, the amplitude of E26 becomes small (FIG. 2*h*). As clearly seen from FIGS. 2*c*, 2*g* and 2*h*, E24 is amplitude-modulated by the potential of E28 and changed to E26.

Figure 2:
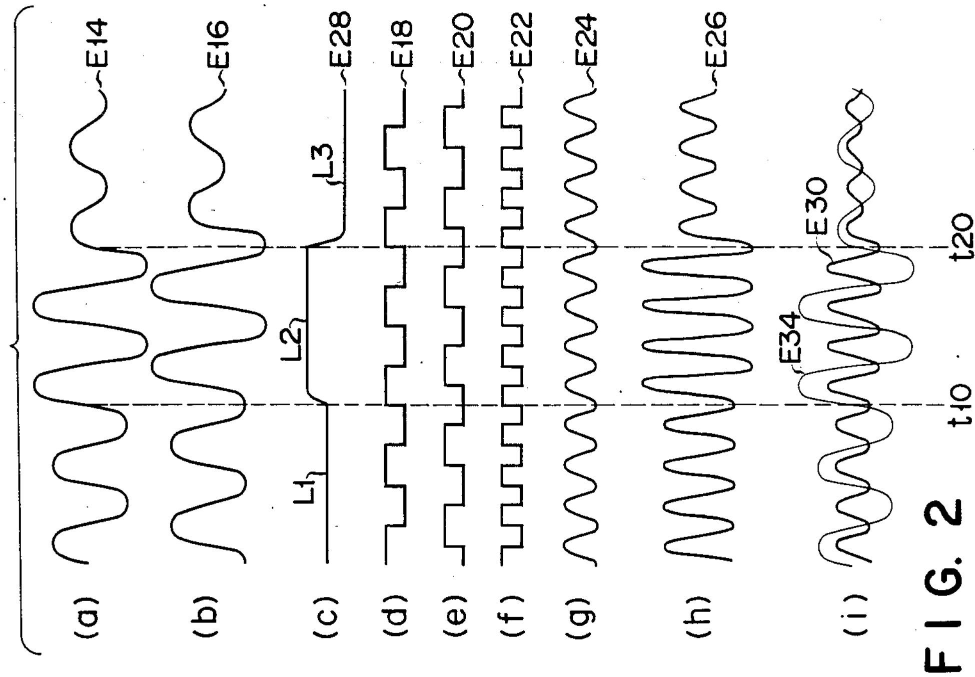
FIG. 2 illustrates waveforms appearing in high frequency synthesizer part 100 of FIG. 1.
Figure 16:
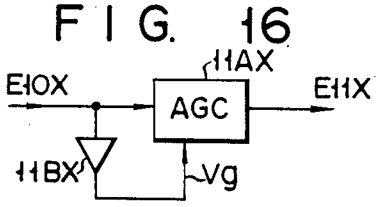
FIG. 16 shows an example of the configuration of circuit 11X in FIG. 13.

Details regarding the configuration of rectifier 28 are disclosed in FIGS. 2, 16, etc. of U.S. Pat. No. 4,430,627, which is incorporated by reference herein. Generally speaking, rectifier 28 may be formed of two squaring circuits for providing $E14^2$ and $E16^2$ and an adder for providing $E14^2+E16^2$ (=E28).

An output signal E26 from VCA 26 is supplied to an attenuator (ATT) 30 by which the amplitude of E26 is properly adjusted. ATT 30 may be an amplifier as the case may require. An output signal E10 from ATT 30 is supplied to an analog mixer 32. The said input signal E100 is phase-shifted (phase-advanced or phase-delayed) by a phase shifter 34. An output signal E34 from shifter 34 is supplied to mixer 32. In mixer 32, for high-frequency compensation E30 is mixed with the narrow range signal E34 (FIG. 2*i*). By this mixing, in-phase components of E30 and E34 are added to each other, and antiphase components thereof are subtracted from one another, thereby obtaining a first synthesized signal E200 (50 Hz−16 kHz) which is frequency-expanded toward the high frequency side.

When shifter 34 is a phase-variable type, the phase difference between E30 and E34 can be optionally adjusted. The phase shift amount of shifter 34 may be controlled by E28, or E100 inputted to shifter 34 may be phase-modulated according to E28, for obtaining a specific sound effect. The configuration of such a controllable phase shifter will be described later with reference to FIG. 12. Phase shifter 34 may be provided in the signal line of elements 10 to 32, or shifter 34 may be omitted.

Circuit elements 10 to 34 therefore constitute a high-frequency synthesizer part 100.

Figure 3:
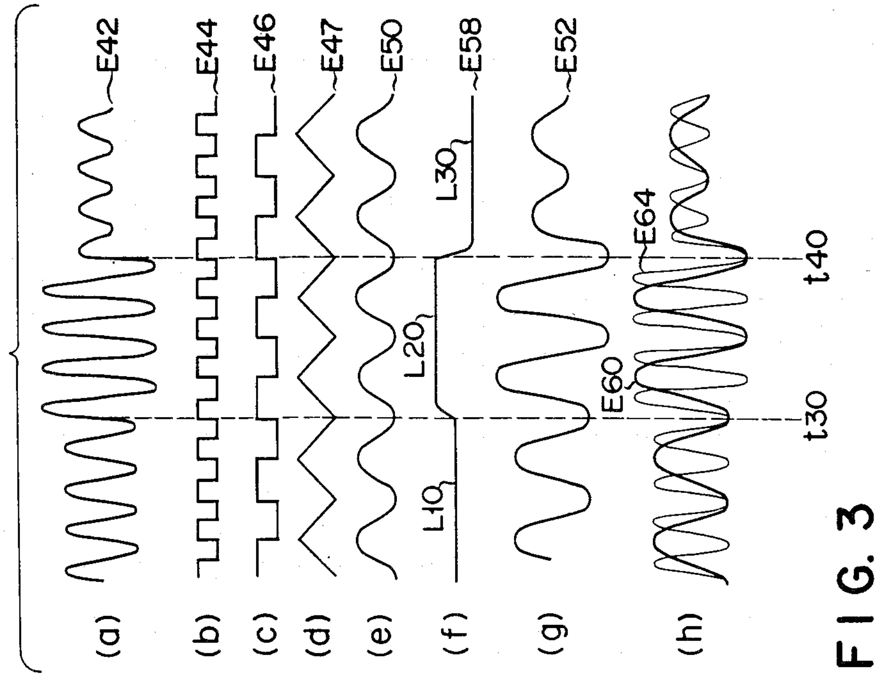
FIG. 3 illustrates waveforms appearing in low frequency synthesizer part 200 of FIG. 1.

First synthesized signal E200 (50 Hz−16 kHz) is supplied to a low-frequency equalizer (LFEQ) 40. LFEQ 40 compensates the decrement of E200 for 50 Hz to 100 Hz. LFEQ 40 may be omitted as the case may be. An output signal E40 from LFEQ 40 is supplied to a BPF 42. Signal components of 50 Hz to 100 Hz are extracted from E40 by BPF 42. BFF 42 may be replaced by a low-pass filter having a cut-off frequency of about 100 Hz. An output signal E42 from BPF 42 is supplied to a waveshaper (zero-cross sensor) 44. An output signal E44 from waveshaper 44 is supplied to a ½ frequency divider 46. Waveforms of E42 and E44 are respectively illustrated in FIGS. 3*a* and 3*b*. Divider 46 may be a modulo-2 binary counter (T flip-flop) or a programmable counter. When a programmable counter having a dividing ratio of N is used, the frequency of E44 is divided by the optional number N. Generally, a modulo-2 or modulo-3 counter may be used for divider 46.

Outputted from divider 46 is a rectangular signal E46 having a fundamental frequency of 25 Hz to 50 Hz (FIG. 3*c*). E46 is integrated through an integration circuit 47 and changed to a triangular signal E47 according to the integration operation with respect to time (FIG. 3*d*). The frequency response to circuit 47 is decremented with −6 dB/oct as the frequency of E46 rises. When such a frequency response decrement is to be compensated, an equalizer (not shown) having proper high-enhancing frequency characteristics or an ALC circuit for suppressing the level change of E47 may be provided at the output stage of circuit 47.

Triangular signal E47 is converted into a sine wave signal E48 via a wave converter 48. Wave converter 48 may be a tangential approximation circuit which is conventionally used in a function generator, or it may be a ROM in which "x to sin x" type conversion data is stored and E47 is used for the address data x so as to read-out the sin x data. Residual higher harmonics involved in sine wave signal E48 are eliminated or suppressed by an LPF 50 (This filter 50 may be a BPF.).

Thus, a low-distortion output signal E50 is obtained from LPF 50 (FIG. 3*e*).

Figure 15:
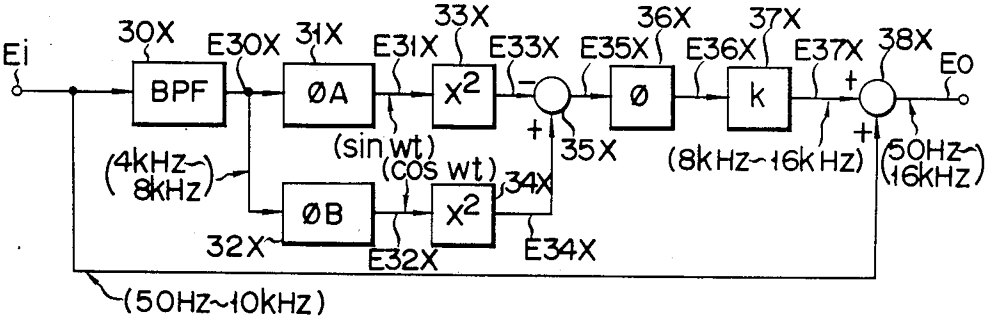
FIG. 15 shows a block configuration of a signal synthesizer which is another embodiment of the invention, wherein a relation "$\cos^2 wt-\sin^2 wt=\cos 2\,wt$" is utilized.

E50 is supplied to a VCA 52. The amplification factor or attenuation degree of VCA 52 is controlled by the potential of a control signal E58. In other word, E50 is amplitude-modulated by E58. E58 is obtained from a rectifier 58. Supplied to rectifier 58 are signals E54 and E56 between which a phase difference of about 90 degrees exists. E54 is obtained by phase-shifting E42 via a phase shifter 54, and E56 is obtained by phase-shifting E42 via a phase shifter 56. When E58 is obtained based on the relation "$E54^2+E56^2$", the configuration of elements 54, 56 and 58 may be substantially the same as those of said elements 14, 16 and 28. Rectifier 58 may have the configuration of a vector-composition circuit and control signal generation circuit as shown in FIGS. 15, 16, etc., of the mentioned U.S. Pat. No. 4,430,627. In this case the phase difference between E54 and E56 may be about 45 degrees.

How the amplitude-modulation in VCA 52 is performed is illustrated in FIGS. 3*a*, 3*f* and 3*g*. When E42 has a medium amplitude, the potential of E58 is L10 and the amplitude of an output signal E52 from VCA 52 is medium (before t30 in FIGS. 3*a*, 3*f* and 3*g*). When the amplitude of E42 becomes large, the potential of E58 rises from L10 to L20 and the amplitude of E52 becomes large (between t30 and t40 in FIGS. 3*a*, 3*f* and 3*g*). When the amplitude of E42 becomes small, the potential of E58 falls from L20 to L30 and the amplitude of E52 becomes small (after t40 in FIGS. 3*a*, 3*f* and 3*g*). As clearly seen from FIGS. 3*e*, 3*f* and 3*g*, E50 is amplitude-modulated by the potential of E58, so that the amplitude of E52 corresponds to that of E42.

E52 is supplied to an ATT 60 by which the amplitude of E52 is properly adjusted. ATT 60 may be an amplifier. An output signal E60 from ATT 60 is supplied to an analog mixer 62. Said first synthesized signal E200 is properly phase-shifted (phase-advanced or phase-delayed) by a phase shifter 64. An output signal E64 from shifter 64 is supplied to mixer 62. In mixer 62, E60 for low-frequency compensation is mixed with E64 (FIG. 3*h*). By this mixing, in-phase components of E60 and E64 are added to each other, and antiphase components thereof are subtracted from one another, thereby obtaining a second synthesized signal E300 (25 Hz–16 kHz) which is frequency-expanded toward the low frequency side.

When phase shifter 64 is a variable type, the phase difference between E60 and E64 can be optionally adjusted. The phase shift amount of shifter 64 may be controlled by E58 for obtaining a specific sound effect. Phase shifter 64 may be omitted as the case may be.

Circuit elements 40 to 64 therefore constitute a low-frequency synthesizer part 200.

According to the embodiment of FIG. 1, first synthesized signal E200 having a frequency range of 50 Hz to 16 kHz and second synthesized signal E300 having a frequency range of 25 Hz to 16 kHz can be obtained from a narrow frequency range input signal E100 of 50 Hz to 8 kHz.

In FIG. 1 an analog/digital hybrid configuration is employed. However, when an analog input signal is A/D converted and a digital output signal is D/A converted, a complete digital configuration can be reduced to practice.

The frequency range expanding operation of the invention is completely different from the frequency response boosting operation of a conventional tone controller or conventional frequency equalizer. According to the present invention the frequency-range expanding operation is effectively performed without a large increase in noise. Further, when the amplitude of synthesized signal E200 or E300 is determined according to the square of the amplitude of input signal E100 (i.e., E28 or E58 is proportional to $E12^2$ to $E42^2$), the sound image (feeling) of E200 or E300 reproduced from speakers can be changed from that obtained when the amplitude of E200 or E300 is directly determined according to the amplitude of E100.

Incidentally, high-frequency synthesizer part 100 may be used independently of low-frequency synthesizer part 200.

Figure 4:
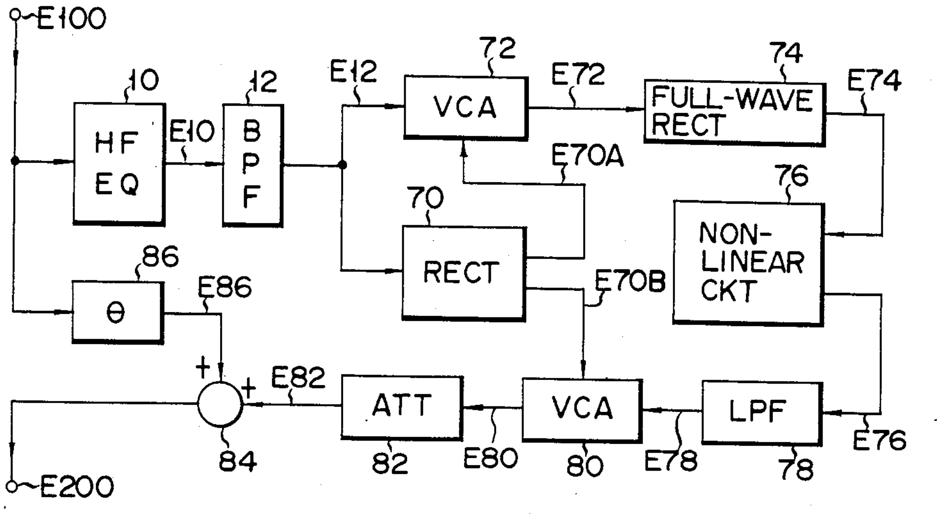
FIG. 4 shows a block configuration of a signal synthesizer which is another embodiment of the invention.
Figure 8:
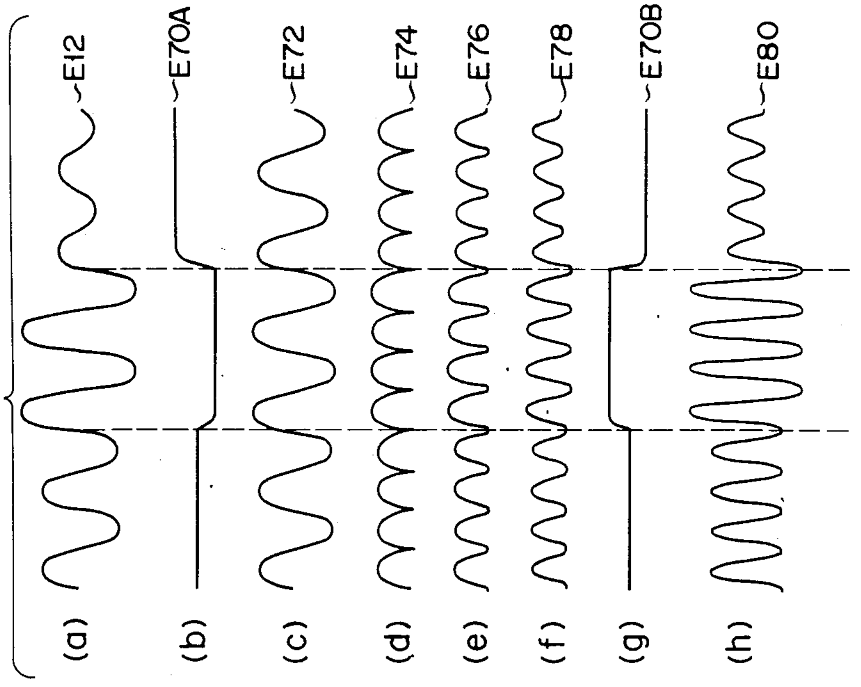
FIG. 8 illustrates waveforms appearing in the configuration of FIG. 4.

FIG. 4 shows another embodiment of the invention. FIG. 8 illustrates waveforms appearing in the configuration of FIG. 4. In the embodiment of FIG. 1, second harmonic components of E12 are derived from the EXOR of E18 and E20 between which a phase difference of about 90 degrees is established. On the other hand, in the embodiment of FIG. 4, second harmonic components of E12 are obtained by full-wave rectifying (frequency-doubling) the signal E12.

E12 (FIG. 8*a*) is supplied to a rectifier 70 and a VCA 72. Rectifier 70 generates a first control signal E70A (FIG. 8*b*). The potential of E70A is inversely-proportional to the amplitude (or the square thereof) of E12. Rectifier 70 also generates a second control signal E70B (FIG 8*g*) whose potential is proportional to the amplitude (or the square thereof) of E12. E70A may be obtained by phase-inverting the potential of E70B, and E70B may be obtained from a configuration corresponding to the combination of elements 14, 16 and 28 of FIG. 1 (In this case, E28 corresponds to E70B).

E70A (FIG. 8*b*) is supplied to VCA 72. VCA 72 amplifies E12 with an amplification factor which is proportional to the potential of E70A. Then, the variation of amplitude of E12 is compressed or suppressed according to the potential change of E70A, and the compressed E12 is changed to a signal E72 having a substantially constant amplitude (FIG. 8*c*). E72 is supplied to a full-wave rectifier 74. A conventional linear rectifier circuit in which rectifying diodes are provided in the NF branch of OP amplifiers may be used for the rectifier 74. E72 is full-wave rectified by rectifier 74 and changed to a positive (or negative) pulsate signal E74 (FIG. 8*d*).

Figure 5:
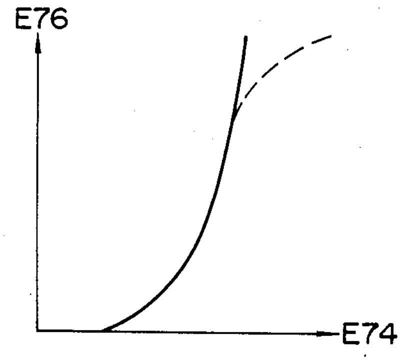
FIG. 5 illustrates an input/output characteristic of nonlinear circuit 76 shown in FIG. 4.

E74 has a distorted waveform as shown in FIG. 8*d* and is supplied to a nonlinear circuit 76. Circuit 76 may have an input/output characteristic as shown in FIG. 5. The nonlinear characteristic of circuit 76 around small signal levels serves to convert the highly distorted signal E74 into a quasi sine signal E76 as shown in FIG. 8*e*. The waveform distortion of E76 is decreased via an LPF 78. Although an output signal E78 (FIG. 8*f*) from LPF 78 involves a little waveform distortion, this distortion provides no practical problem because higher harmonic distortions over 8 kHz are almost not audible.

E78 is supplied to VCA 80. VCA 80 amplifies E78 with an amplification factor which is proportional to the potential of E70B (FIG. 8*g*). Then, the amplitude of an output signal E80 (FIG. 8*h*) from VCA 80 varies with the potential of E70B. Thus, the amplitude information of E80 corresponds to that of E12. The reason why E12 is amplitude-compressed and E78 is amplitude-expanded is that nonlinear circuit 76 having a characteristic as shown in FIG. 5 requires a substantially constant input level for proper waveform conversion.

The amplitude of E80 is properly adjusted through an ATT 82. An output signal E82 from ATT 82 is supplied to an analog mixer 84. Mixer 84 receives an output signal E86 from a phase shifter 86 and provides first synthesized signal E200 corresponding to input signal E100 with higher frequency components.

Elements 70, 72 and 76 to 80 may be omitted from the configuration of FIG. 4 when no severe requirement regarding the sound quality exists. In this case, E12 may be directly supplied to full-wave rectifier 74 and its rectified output E74 may be directly supplied to ATT82. (However, it is preferable to provide an LPF between rectifier 74 and ATT 82.) Further, as in the case of FIG. 1, phase shifter 86 may be phase-modulated according to E70A or E70B.

Figure 6:
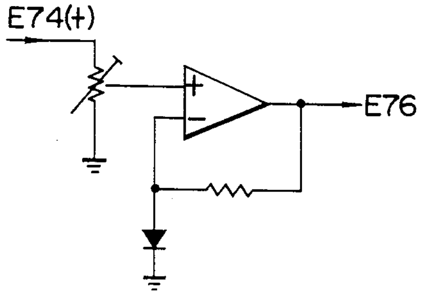
FIG. 6 shows an example of the circuit configuration of circuit 76 in FIG. 4.
Figure 7:
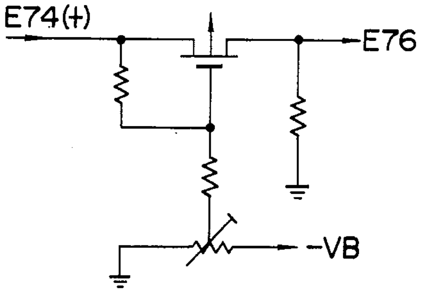
FIG. 7 shows another example of the circuit configuration of circuit 76 in FIG. 4.

FIGS. 6 and 7 respectively show examples of nonlinear circuit 76 in FIG. 4. In the circuit of FIG. 6 the NFB circuit branch of an OP amplifier is provided with a diode having a nonlinear voltage—current characateristic, thereby obtaining a characteristic as shown by the solid line in FIG. 5. In FIG. 7 the nonlinearlity of Vg−Id (gate voltage−drain current) characteristic of an FET is utilized to obtain a circuit having a characteristic as shown by the broken line in FIG. 5. Circuit 76 may be a conventional log amplifier.

Figure 10:
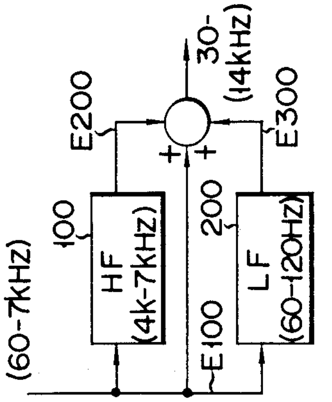
FIG. 10 shows another modification of FIG. 1 wherein high frequency synthesizer part 100 is coupled in parallel to low frequency synthesizer part 200.
Figure 9:
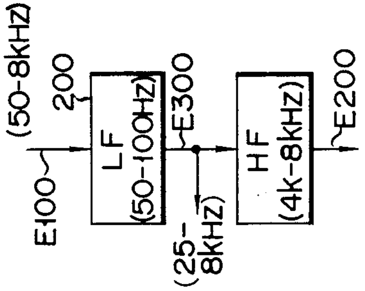
FIG. 9 shows a modification of FIG. 1 wherein high frequency synthesizer part 100 is coupled in series to the output circuit of low frequency synthesizer part 200.
Figure 11:
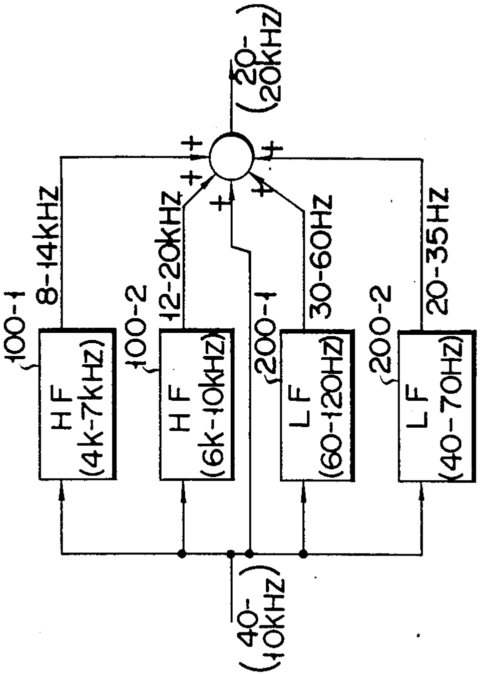
FIG. 11 shows still another modification of FIG. 1; wherein high frequency synthesizer part 100 and low frequency synthesizer part 200 are respectively divided into two parts, and these divided parts are coupled in parallel.

FIGS. 9 to 11 respectively show modifications of FIG. 1. In FIG. 9 the low frequency synthesizing is performed before the high frequency synthesizing is carried out. In FIG. 10 the high frequency synthesizing is performed in parallel with the low frequency synthesizing. In FIG. 11 the high frequency synthesizer part is divided into two (or more) parts and the low frequency synthesizer part is divided into two (or more) parts. A first high frequency synthesizer part 100-1 synthesizes 8 kHz to 14 kHz components from 4 kHz to 7 kHz components, and a second high frequency synthesizer part 100-2 synthesizes 12 kHz to 20 kHz components from 6 kHz to 10 kHz components. Similarly, a first low frequency synthesizer part 200-1 synthesizes 30 Hz to 60 Hz components from 60 Hz to 120 Hz components, and a second low frequency synthesizer part 200-2 synthesizes 20 Hz to 35 Hz components from 40 Hz to 70 Hz components. The frequency overlapping between higher parts 100-1 and 100-2 (6 kHz-7 kHz) and between lower parts 200-1 and 200-2 (60 Hz-70 Hz) may be deleted. A hybrid configuration of any of FIGS. 9 to 11 may be practiced, of course.

Figure 12:
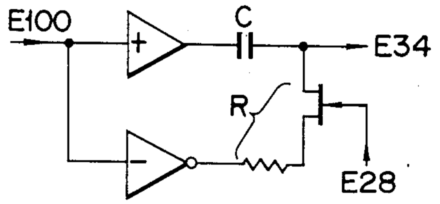
FIG. 12 shows an example of the circuit configuration of phase shifter 34 whose phase shift amount is controlled by the potential of signal E28 of FIG. 1.

FIG. 12 shows an example of phase shifter 34 whose phase shift amount is controlled by the potential of E28. In the configuration of FIG. 12 a resistor element R of an RC time constant circuit includes the inner resistance of an FET. This inner resistance is varied according to the potential of E28 applied to the gate of the FET. Thus, a reference frequency at which the phase of E34 is shifted by 90 degrees from E100 is controlled by E28. A variable impedance according to U.S. Pat. No. 3,761,741 may be utilized for the resistor element R. Other illustrated phase shifters may have the same configuration as shown in FIG. 12.

VCAs 26, 52, 72 and 80 may be a conventional ALC or AGC circuit as disclosed in U.S. Pat. No. 3,725,800 or No. 3,921,091. Rectifiers 28, 58 and 70 may be constructed according to the circuit shown in FIG. 15 of the mentioned U.S. Pat. No. 4,430,627, in which a control signal e4 corresponding to E28, E58 or E70 is composed from polyphase signals e1 and $e3_1$ to $e3_3$.

Circuits of filters, VCAs, etc., utilized in the embodiments may be conventional, which are disclosed in: "MODERN ELECTRONIC CIRCUITS REFERENCE MANUAL" John Markus, Ed., McGRAW-HILL BOOK COMPANY, USA (1980). All disclosures of the above manual, U.S. Pat. Nos. (3,761,741; 3,725,800; 3,921,091) and PCT application No. (JP/78/00040) are incorporated by reference in the present application.

Figure 13:
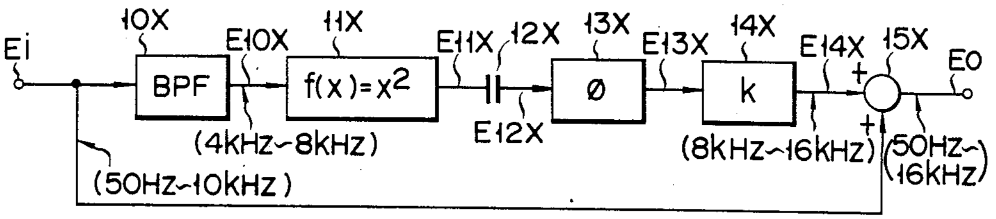
FIG. 13 shows a block configuration of a signal synthesizer which is another embodiment of the invention, wherein a relation "$\cos^2 wt=(1+\cos 2\,wt)/2$" is utilized.

FIG. 13 shows a block configuration of a signal synthesizer which is another embodiment of the invention, wherein a relation "$\cos^2 wt=(1+\cos 2wt)/2$" is utilized for obtaining a second harmonic component cos 2wt from an input signal component cos wt.

A narrow range analog input signal Ei (e.g., 50 Hz-10 kHz) corresponding to E100 of FIG. 1 is supplied to a BPF 10X. Higher frequency components (e.g., 4 kHz-8 kHz) of Ei are extracted as a signal E10X by BPF 10X. E10X is supplied to a function converter (analog squaring circuit) 11X. When E10X is represented by E cos wt (E denotes the amplitude of E10X and w denotes the angular frequency thereof), converter 11X generates a signal E11X corresponding to $E^2 \cos^2$ wt. Since $\cos^2 wt=(1+\cos 2wt)/2$, E11X corresponds to $E^2/2+(E^2/2)$ cos 2wt. The time-independent component ($E^2/2$) of E11X is removed by a capacitor 12X. Thus, a second harmonic signal E12X corresponding to $(E^2/2)$ cos 2wt is obtained from capacitor 12X. The phase of E12X is delayed or advanced by proper degrees through a phase shifter 13X. The amplitude of an output signal E13X from shifter 13X is optionally adjusted by the coefficient K of a potentiometer 14X. Potentiometer 14X may include a level compander (compressor/expander) whose compression or expansion degree may be controlled by the amplitude of E10X, E11X, E12X or E13X.

An output signal E14X from potentiometer 14X has an amplitude $(KE^2/2)$ corresponding to the amplitude (E) of Ei and includes higher frequency components (8 kHz–16 kHz) which are not contained in the extracted signal E10X (4 kHz–8 kHz). E14X (8 kHz–16 kHz) is added to Ei (50 Hz–10 kHz) in an analog adder 15X. Adder 15X provides a wide range output signal Eo (50 Hz–16 kHz) which corresponds to E200 of FIG. 1.

Function converter 11X of FIG. 13 may be formed of a nonlinear circuit (76) which generates second or more higher-order harmonic components of E10X. When a waveform distortion due to the nonlinearity of converter 11X should be reduced, any one of E11X to E14X may be divided by the amplitude component of E10X.

Incidentally, a relation "$\sin^2 wt=(1-\cos 2wt)/2$" may be applied to the configuration of FIG. 13 in place of the use of the relation "$\cos^2 wt=(1+\cos 2wt)/2$."

Figure 14:
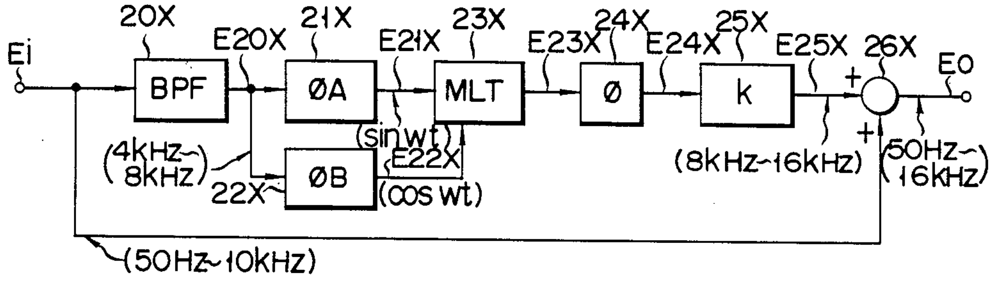
FIG. 14 shows a block configuration of a signal synthesizer which is another embodiment of the invention, wherein a relation "$\sin wt.\cos \mathrm{wt}=(\sin 2\,wt)/2$" is utilized.

FIG. 14 shows a block configuration of a signal synthesizer which is another embodiment of the invention, wherein a relation "sin wt.cos $wt=(\sin 2wt)/2$" is utilized.

A narrow range signal Ei (e.g., 50 Hz–10 kHz) corresponding to E100 of FIG. 1 is supplied to a BPF 20X. Higher frequency components (e.g., 4 kHz–8 kHz) of Ei are extracted as a signal E20X by BPF 20X. E20X is supplied to phase shifters 21X and 22X. Shifter 21X outputs a signal E21X with a phase delay (or advance) $\phi$A, and shifter 22X outputs a signal E22X with a phase delay (or advance) $\phi$B. The phase shift amount $\phi$A of shifter 21X and the phase shift amount $\phi$B of shifter 22X are selected such that the phase difference between E21X and E22X becomes about 90 degrees for 4 kHz to 8 kHz. In this case, when E21X is represented by E sin wt, E22X may be represented by E cos wt. E21X and E22X are supplied to an analog multiplier 23X. Multiplier 23X multiplies E21X by E22X and provides a signal E23X corresponding to $E^2$ sin wt.cos wt. Since sin $wt$.cos $wt=(\sin 2wt)/2$, E23X corresponds to $(E^2/2)$ sin 2wt having frequency components of 8 kHz to 16 kHz. Thus, a second harmonic signal E23X corresponding to $(E^2/2)$ sin 2wt is obtained from multiplier 23X.

The phase of E23X is delayed or advanced by proper degrees through a phase shifter 24X. The amplitude of an output signal E24X from shifter 24X is optionally adjusted by the coefficient K of a potentiometer 25X. Potentiometer 25X may include a level compander whose compression or expansion degree may be controlled by E20X, E21X, E22X, E23X or E24X. Elements 24X and 25X of FIG. 14 may have the same configurations as elements 13X and 14X of FIG. 13.

An output signal E25X from potentiometer 25X has an amplitude $(KE^2/2)$ corresponding to the amplitude (E) of Ei and includes higher frequency components (8 kHz–16 kHz) which are not contained in the extracted signal E20X (4 kHz–8 kHz). E25X (8 kHz–16 kHz) is added to Ei (50 Hz–10 kHz) in an analog adder 26X. Adder 26X provides a wide range output signal Eo (50 Hz–16 kHz) corresponding to E200 of FIG. 1.

The operation of multiplier 23X in FIG. 14 is nonlinear. When a waveform distortion due to the nonlinearity of multiplier 23X is to be reduced, any one of E23X to E25X may be divided by the amplitude component of any one of E20X to E22X.

FIG. 15 shows a block configuration of a signal synthesizer which is another embodiment of the invention, wherein a relation "$\cos^2 wt-\sin^2 wt=\cos 2wt$" is utilized.

A narrow range signal Ei (e.g., 50 Hz–10 kHz) corresponding to E100 of FIG. 1 is supplied to a BPF 30X. Higher frequency components (e.g., 4 kHz–8 kHz) of Ei are extracted as a signal E30X by BPF 30X. E30X is supplied to phase shifters 31X and 32X. Shifter 31X outputs a signal E31X with a phase delay (or advance) $\phi$A, and shifter 32X outputs a signal E32X with a phase delay (or advance) $\phi$B. The phase shift amounts $\phi$A and $\phi$B are selected such that the phase difference between E31X and E32X becomes about 90 degrees for 4 kHz to 8 kHz. E31X (E sin wt) and E32X (E cos wt) are supplied to square function circuits 33X and 34X, respectively. Circuit 33X provides a signal E33X corresponding to $E^2 \sin^2$ wt, and circuit 34X provides a signal E34X corresponding to $E^2 \cos^2$ wt. E33X is subtracted from E34X in an analog subtractor 35X. Subtractor 35X provides a signal E35X corresponding to E34X − E33X or $E^2(\cos^2 wt-\sin^2 wt)$. Since $\cos^2 wt-\sin^2 wt=\cos 2wt$, E35X corresponds to $E^2$ cos 2wt having frequency components of 8 kHz to 16 kHz. The phase of E35X is delayed or advanced by proper degrees through a phase shifter 36X. The amplifier of an output signal E36X from shifter 36X is optionally adjusted by the coefficient K of a potentiometer 37X. Potentiometer 37X may include a level compander whose compression or expansion degree may be controlled by E30X, etc. Elements 36X and 37X of FIG. 15 may have the same configurations as elements 13X and 14X of FIG. 13.

An output signal E37X from potentiometer 37X has an amplitude $(KE^2)$ corresponding to the amplitude (E) of Ei. E37X also includes frequency components (8 kHz–16 kHz) which are not contained in the frequency components (4 kHz–8 kHz) of extracted signal E30X. E37X (8 kHz–16 kHz) is added to Ei (50 Hz–10 kHz) in an analog adder 38X. Adder 38X provides a wide range output signal Eo (50 Hz–16 kHz) corresponding to E200 of FIG. 1.

The operation of square circuits 33X and 34X in FIG. 15 is nonlinear. When a waveform distortion due to this nonlinearity should be reduced, both of E33X and E34X or any one of E35X to E37X may be divided by the amplitude component of any one of E30X to E32X.

FIG. 16 shows an example of function converter 11X in FIG. 13, wherein an AGC (or ALC) circuit is utilized. In FIG. 16, E10X (=E cos wt) is inputted to an AGC circuit 11AX. A gain control signal Vg of circuit 11AX is obtained from E10X via a limiter 11BX. Limiter 11BX eliminates the change of amplitude of E10X and provides Vg. The gain of circuit 11AX is determined by the amplitude (or potential) of Vg having a frequency equal to the frequency of E10X. Thus, circuit 11AX functions as an AM modulator for AM-modulating E10X (=E cos wt) by Vg (=cos wt) to provide a second harmonic signal E11X (=E $\cos^2$ wt) which has a frequency component (cos 2wt) being equal to the sum of the frequencies of E10X and Vg.

According to the configuration of FIG. 16, the amplitude of E11X is substantially proportional to the amplitude of E10X because the amplitude of Vg is substantially fixed. From this, a waveform distortion of E11X becomes smaller than that of E11X in FIG. 13.

Figure 17:
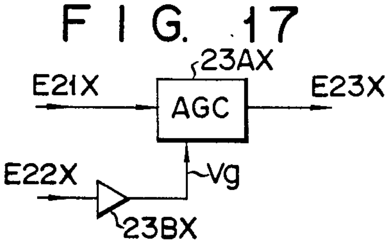
FIG. 17 shows an example of the configuration of circuit 23X in FIG. 14.

FIG. 17 shows an example of analog multiplier 23X in FIG. 14, wherein an AGC (or ALC) circuit is utilized. In FIG. 17, E21X (=E sin wt) is inputted to an AGC circuit 23AX. A gain control signal Vg of circuit 23AX is obtained from E22X via a limiter 23BX. Limiter 23BX eliminates the change of amplitude of E22X and provides Vg. The gain of circuit 23AX is determined by the amplitude (or potential) of Vg whose frequency is equal to the frequency of E22X. Thus, circuit 23AX AM-modulates E21X (=E sin wt) by Vg (=cos wt) to provide a second harmonic signal E23X (=E sin wt.cos wt) which has a frequency component (sin 2wt) being equal to the sum of the frequencies of E21X and Vg.

According to the cofiguration of FIG. 17, the amplitude of E23X is substantially proportional to the amplitude of E21X because the amplitude of Vg is substantially fixed. From this, the waveform distortion of E23X becomes smaller than that of E23X in FIG. 14.

Figure 18:
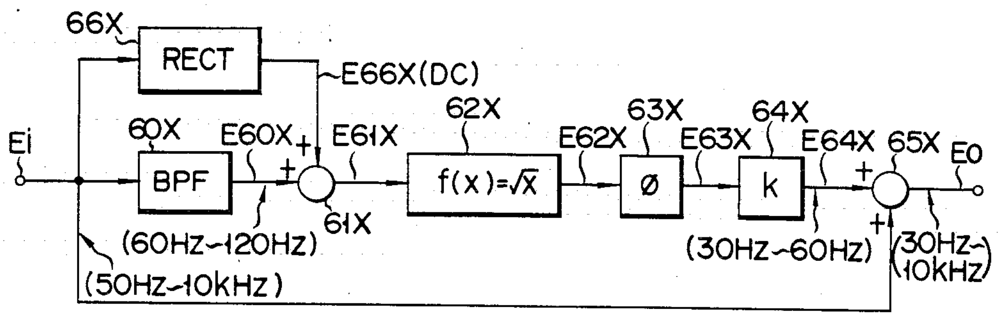
FIG. 18 shows a block configuration of a signal synthesizer which is another embodiment of the invention, wherein a relation "$\cos\,(wt/2)=\sqrt{(1+\cos\,wt)/2}$" is utilized.

FIG. 18 shows a block configuration of a signal synthesizer which is another embodiment of the invention, wherein a relation "cos $(wt/2)=\sqrt{(1+\cos wt)/2}$" is utilized to obtain a ½ order lower harmonic signal.

A narrow range signal Ei (e.g., 50 Hz–10 kHz) corresponding to E100 of FIG. 1 is supplied to a BPF 60X. Lower frequency components (e.g., 60 Hz–120 Hz) of Ei are extracted as a signal E60X by BPF 60X. E60X is supplied to an analog adder 61X. Ei is rectified by a rectifier 66X. The configuration of rectifier 66X may be the same as the combination of elements 14, 16 and 28 in FIG. 1 (Ei and E66X correspond to E12 and E28, respectively). A rectified output E66X (DC) from rectifier 66X is added to E60X in adder 61X. Adder 61X outputs a signal E61X corresponding to the sum of E60X and E66X. E61X is supplied to a function converter (analog square root circuit) 62X. When E61X is represented by 2E(1+cos wt)/2 (E denotes the amplitude of E61X and w denotes the angular frequency thereof), converter 62X generates a signal E62X corresponding to $\sqrt{2}$E cos (wt/2). Thus, a ½ order lower harmonic signal E62X of $\sqrt{2}$E cos (wt/2) is obtained.

The phase of E62X is delayed or advanced by proper degrees through a phase shifter 63X. The amplitude of an output signal E63X from shifter 63X is optionally adjusted by the coefficient K of a potentiometer 64X. Potentiometer 64X may include a level compander whose compression or expansion degree may be controlled by the amplitude of E60X, E61X or E62X.

An output signal E64X from potentiometer 64X has an amplitude corresponding to the amplitude of Ei. E64X also includes frequency components (30 Hz–60 Hz) which are not contained in the extracted signal E60X (60 Hz–120 Hz). E64X (30 Hz–60 Hz) is added to Ei (50 Hz–10 kHz) in an analog adder 65X. Adder 65X provides a wide range output signal Eo (30 Hz–10 kHz) corresponding to E200 of FIG. 1.

Figure 19:
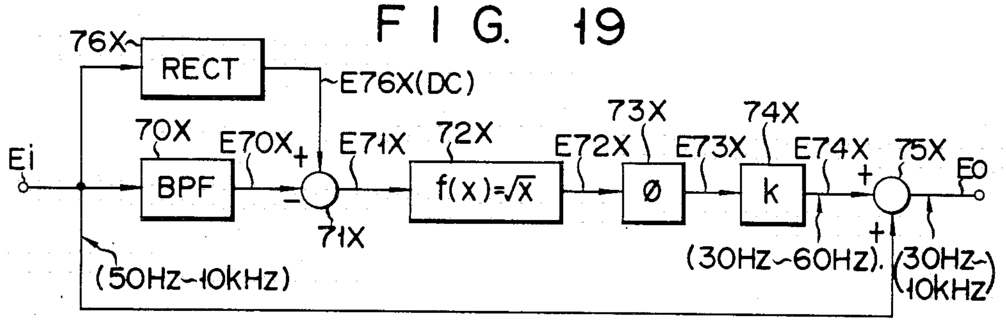
FIG. 19 shows a block configuration of a signal synthesizer which is a modification of FIG. 18, wherein a relation "$\sin\,(wt/2)=\sqrt{(1-\cos\,wt)/2}$" is utilized.

FIG. 19 shows a block configuration of a signal synthesizer which is a modification of FIG. 18, wherein a relation "sin $(wt/2)=\sqrt{(1-\cos wt)/2}$" is utilized to obtain a ½ order lower harmonic signal.

Ei (e.g., 50 Hz–10 kHz) corresponding to E100 is supplied to a BPF 70X. Lower frequency components (e.g., 60 Hz–120 Hz) of Ei are extracted as a signal E70X by BPF 70X. E70X is supplied to an analog subtractor 71X. Ei is rectified by a rectifier 76X. The configuration of rectifier 76X may be the same as the rectifier 66X of FIG. 18. E70X is subtracted in subtractor 71X from a rectified output E76X (DC) of rectifier 76X. Subtracter 71X outputs a signal E71X corresponding to the difference between E76X and E70X. E71X is supplied to a function converter (analog square root circuit) 72X. When E71X is represented by 2E(1−cos wt)/2, converter 72X generates a signal E72X corresponding to $\sqrt{2}$E sin (wt/2). Thus, a ½ order lower harmonic signal E72X of $\sqrt{2}$E sin (wt/2) is obtained.

The phase of E72X is delayed or advanced by proper degrees through a phase shifter 73X. The amplitude of an output signal E73X from shifter 73X is optionally adjusted by the coefficient K of a potentiometer 74X. Potentiometer 74X may include a level compander whose compression or expansion degree may be controlled by the amplitude of E70X, E71X or E72X.

An output signal E74X from potentiometer 74X has an amplitude corresponding to the amplitude of Ei. E74X also includes frequency components (30 Hz–60 Hz) which are not contained in the extracted signal E70X (60 Hz–120 Hz). E74X (30 Hz–60 Hz) is added to Ei (50 Hz–10 kHz) in an analog adder 75X. Adder 75X provides a wide range output signal Eo (30 Hz–10 kHz) corresponding to E200 of FIG. 1.

Figure 20:
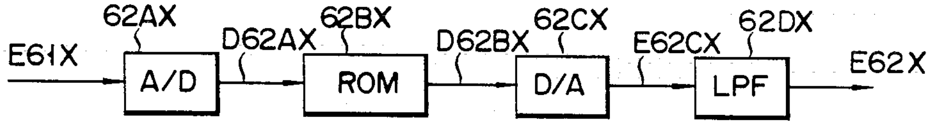
FIG. 20 shows an example of the configuration of circuit 62X in FIG. 18.

FIG. 20 shows a digital configuration of circuit 62X in FIG. 18. Analog signal E61X (E(1+cos wt)) is converted into a digital signal D62AX by an A/D converter 62AX. The conversion rate in converter 62AX is, e.g., 40 kHz. D62AX is supplied as address data (E (1+cos wt)) to a ROM 62BX in which digital data of $\sqrt{E}$ (1+cos wt) or E$\sqrt{(1+\cos wt)/2}$ is stored. Stored data in ROM 62BX is read out as D62BX with the rate of, e.g., 40 kHz. D62BX is converted into an analog signal E62CX by a D/A converter 62CX. The conversion rate in converter 62CX may also be 40 kHz. High frequency noises involved in E62CX are eliminated through an LPF 62DX, and the converted analog signal E62X is obtained from LPF 62DX.

In the configuration of FIG. 20, when the stored contents of ROM 62BX are properly selected, functional conversions from E sin wt to $E^2 \cos^2$ wt, to E $\cos^2$ wt, to E $\sin^2$ wt, to E sin wt.cos wt, etc., are possible.

Figure 21:
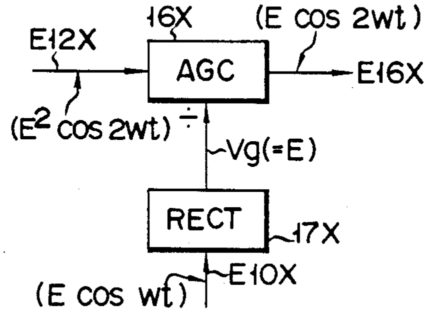
FIG. 21 shows an example of the configuration of analog divider 16X which may be applied to the configuration of FIG. 13.

FIG. 21 shows an analog divider 16X which may be applied to the configuration of FIG. 13. Divider 16X receives E12X containing a square amplitude component ($E^2$ cos 2wt). Divider 16X is formed of an AGC circuit or the like. The gain of this AGC circuit is determined by a control voltage Vg. Vg corresponds to the amplitude (E) of E10X (E cos wt). Vg is obtained by rectifying E10X through a rectifier 17X. Rectifier 17X may have the same configuration as elements 14, 16 and 28 in FIG. 1. Divider 16X in FIG. 21 functions as a level compressor. An output signal E16X from divider 16X may be inputted to phase shifter 13X in FIG. 13.

Figure 22:
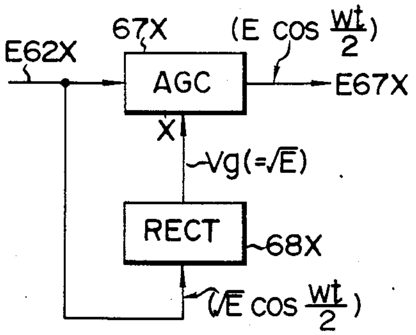
FIG. 22 shows an example of the configuration of analog multiplier 67X which may be applied to the configuration of FIG. 18.

FIG. 22 shows an analog multiplier 67X which may be applied to the configuration of FIG. 18. Multiplier 67X receives E62X containing a square root amplitude component ($\sqrt{E}$ cos (wt/2)). Multiplier 67X is formed of an AGC circuit or the like. The gain of this AGC circuit is determined by a control voltage Vg. Vg corresponds to the square root of amplitude ($\sqrt{E}$) of E62X. Vg is obtained by rectifying E62X through a rectifier 68X. Rectifier 68X may have the same configuration as elements 14, 16 and 28 in FIG. 1. Multiplier 67X in FIG.

22 functions as a level expander. An output signal E67X from multiplier 67X may be inputted to phase shifter 63X in FIG. 18.

Figure 23:
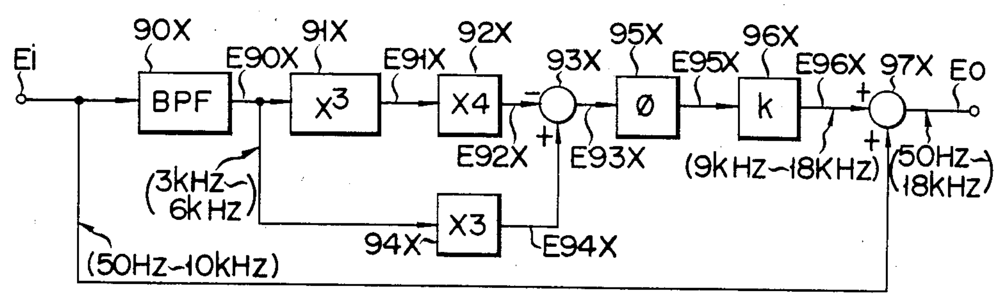
FIG. 23 shows a block configuration of a signal synthesizer which is another embodiment of the invention, wherein a relation "$3 \sin wt-4 \sin^3 wt=\sin 3\,\mathrm{wt}$" is utilized.

FIG. 23 shows a block configuration of a signal synthesizer which is another embodiment of the invention, wherein a relation "3 sin $wt-4$ $\sin^3 wt=\sin 3wt$" is utilized.

A narrow range signal Ei (e.g., 50 Hz–10 kHz) corresponding to E100 of FIG. 1 is supplied to a BPF 90X. Mid-High frequency components (e.g., 3 kHz–6 kHz) of Ei are extracted as a signal E90X by BPF 90X. E90X is supplied to an analog function converter (analog cubing circuit) 91X. When E90X is represented by E sin wt, an output signal E91X from converter 91X is $E^3 \sin^3$ wt (or E $\sin^3$ wt). E91X is supplied to a coefficient multiplier 92X. Multiplier 92X provides a signal E92X corresponding to $4E^3 \sin^3$ wt (or 4E $\sin^3$ wt). E90X is supplied to a coefficient multiplier 94X. Multiplier 94X provides a signal E94X corresponding to 3E sin wt. E92X is subtracted from E94X in an analog subtracter 93X. Subtracter 93X provides a signal E93X corresponding to 3E sin wt$-4E^3 \sin^3$ wt (or 3E sin wt$-$ 4E $\sin^3$ wt). When an approximation $|E^3|\cong|E|$ holds, $E93X=3E \sin wt-4E^3\sin^3 wt=3E \sin wt-4E\sin^3 wt=E\sin 3wt$ is practically obtained. E93X (E sin 3wt) has frequency components of 9 kHz to 18 kHz. The phase of E93X is delayed or advanced by proper degrees through a phase shifter 95X. The amplitude of an output signal E95X from shifter 95X is optionally adjusted by the coefficient K of a potentiometer 96X. Potentiometer 96X may include a level compander whose compression or expansion degree may be controlled by E90X, etc. Elements 95X and 96X of FIG. 23 may have the same configurations as elements 13X and 14X of FIG. 13.

An output signal E96X from potentiometer 96X has an amplitude corresponding to the amplitude of Ei. E96X also includes frequency components (9 kHz–18 kHz) which are not contained in the frequency components (3 kHz–6 kHz) of extracted signal E90X. E96X (9 kHz–18 kHz) is added to Ei (50 Hz–10 kHz) in an analog adder 97X. Adder 97X provides a wide range output signal Eo (50 Hz–18 kHz) corresponding to E200 of FIG. 1.

Figure 24:
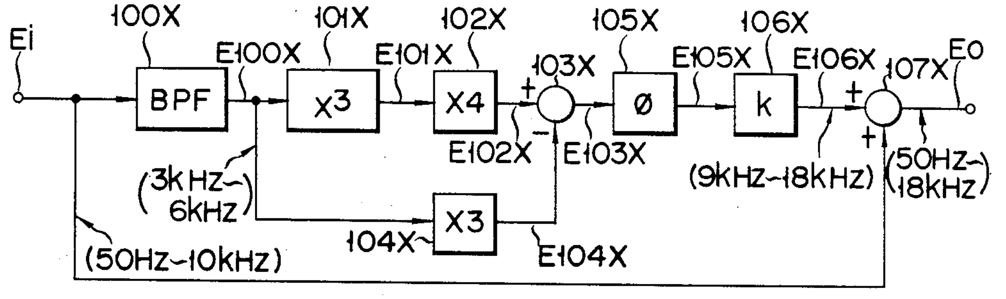
FIG. 24 shows a block configuration of a signal synthesizer which is a modification of FIG. 23, wherein a relation "$4 \cos^3 wt-3 \cos wt=\cos 3\,wt$" is utilized.

FIG. 24 shows a block configuration of a signal synthesizer which is a modification of FIG. 23, wherein a relation "4 $\cos^3 wt-3\cos wt=\cos 3wt$" is utilized.

Ei (e.g., 50 Hz–10 kHz) corresponding to E100 is supplied to a BPF 100X. Mid-High frequency components (e.g., 3 kHz–6 kHz) of Ei are extracted as a signal E100X by BPF 100X. E100X is supplied to an analog function converter (analog cubing circuit) 101X. Converter 101X may have the same configuration as converter 91X of FIG. 23. When E100X is represented by E cos wt, an output signal E101X from converter 101X is $E^3 \cos^3$ wt (or E $\cos^3$ wt). E101X is supplied to a coefficient multiplier 102X. Multiplier 102X provides a signal E102X corresponding to $4E^3 \cos^3$ wt (or 4E $\cos^3$ wt). E100X is supplied to a coefficient multiplier 104X. Multiplier 104X provides a signal E104X corresponding to 3E cos wt. E104X is subtracted from E102X in an analog subtacter 103X. Subtracter 103X provides a signal E103X corresponding to $4E^3 \cos^3$ wt$-$3E cos wt (or 4E $\cos^3$ wt$-$3E cos wt). When an approximation $|E^3|\cong|E|$ holds, $E103X=4E^3\cos^3 wt-3E\cos wt=4E\cos^3 wt-3E\cos wt=E\cos 3wt$ is practically obtained. E103X (E cos 3 wt) has frequency components of 9 kHz to 18 kHz. The phase of E103X is delayed or advanced by proper degrees through a phase shifter 105X. The amplitude of an output signal E105X from shifter 105X is optionally adjusted by the coefficient K of a potentiometer 106X. Potentiometer 106X may include a level compander whose compression or expansion degree may be controlled by E100X, etc. Elements 105X and 106X of FIG. 24 may have the same configurations as elements 13X and 14X of FIG. 13.

An output signal E106X from potentiometer 106X has an amplitude corresponding to the amplitude of Ei. E106X also includes frequency components (9 kHz–18 kHz) which are not contained in the frequency components (3 kHz–6 kHz) of extracted signal E100X. E106X (9 kHz–18 kHz) is added to Ei (50 Hz–10 kHz) in an analog adder 107X. Adder 107X provides a wide range output signal Eo (50 Hz–18 kHz) corresponding to E200 of FIG. 1.

Figure 25:
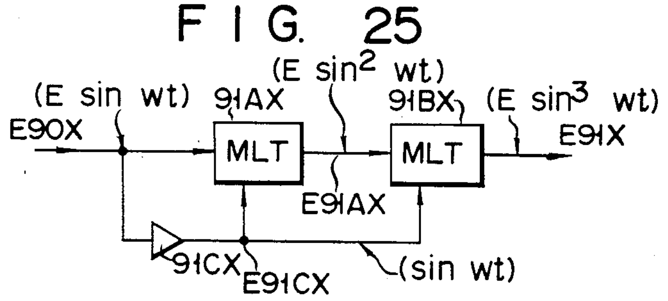
FIG. 25 shows an example of the configuration of analog function converter 91X of FIG. 23.

FIG. 25 shows an example of analog function converter 91X in FIG. 23. E90X (E sin wt) is supplied to a multiplier 91AX and an amplitude limiter (or ALC) circuit 91CX. Circuit 91CX supplies multipliers 91AX and 91BX with a signal E91CX (sin wt) which has a substantially constant amplitude and has the same frequency as E90X. Multiplier 91AX multiplies E90X by E91CX and provides a signal E91AX corresponding to E $\sin^2$ wt. E91AX is multiplied by E91CX in multiplier 91BX. Multiplier 91BX provides E91X corresponding to E $\sin^3$ wt.

A typical application of the synthesizer of FIGS. 1 to 25 is a frequency response equalizer for enhancing or modifying the frequency response of an AM receiver, tape recorder, sound track of VTR, noise reduction system, telephone communication system, or the like.

Figure 26:
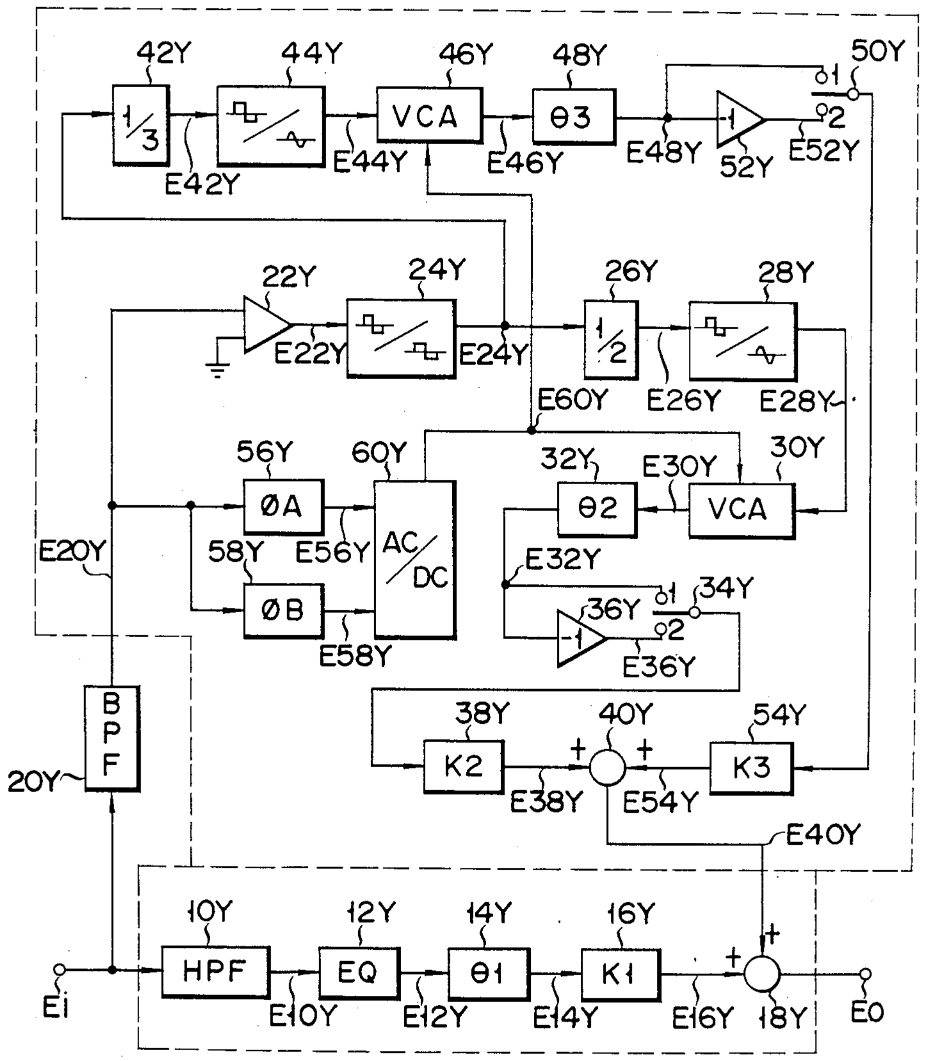
FIG. 26 shows a block configuration of a distortion synthesizer which is one application of the invention, wherein the synthesizer synthesizes a harmonic distortion control signal.

FIG. 26 shows a block configuration of a distortion synthesizer which is one application of the invention, wherein the synthesizer synthesizes a harmonic distortion control signal. To be concrete the synthesizer of FIG. 26 produces a second harmonic distortion (2nd HD) cancel signal for 45 Hz to 90 Hz and produces a third harmonic distortion (3rd HD) cancel signal for 30 Hz to 60 Hz.

Now assume that a music signal Ei having a frequency range of 30 Hz to 15 kHz is obtained from a tape recorder, FM tuner, etc. This Ei may be E200 or E300 of FIGS. 1, 9, etc., or may be Eo of FIGS. 13, 18, etc. Ei is supplied to an HPF 10Y having a cutoff frequency of about 90 Hz. 90 Hz to 15 kHz components of Ei are extracted as a signal E10Y by HPF 10Y. HPF 10Y may be a BPF having a band width of about 90 Hz to 15 kHz. Element 10Y may include a band-rejection filter as the case may be. E10Y is supplied to a frequency-response equalizer (EQ) 12Y. The frequency-response characteristic of EQ 12Y may be determined according to, e.g., the sound pressure frequency-response characteristic of a speaker system (not shown) which is to be driven by an output signal of the synthesizer of this invention. An output signal E12Y from EQ 12Y is supplied to a phase shifter 14Y. The phase of E12Y is advanced or delayed by certain degrees in shifter 14Y. An output signal E14Y from shifter 14Y is supplied to a potentiometer 16Y. Potentiometer 16Y may be an attenuator or amplifier. Potentiometer 16Y changes the amplitude of E14Y by a coefficient K1 and outputs a signal E16Y.

In the configuration of FIG. 26, any of or all of elements 10Y to 16Y can be omitted (i.e., Ei may be directly inputted to adder 18Y) as the case may be.

Ei is supplied to a BPF 20Y having a band width of about 90 Hz to 180 Hz. BPF 20Y extracts 90 Hz to 180 Hz components of Ei to provide a signal E20Y. E20Y is supplied to a zero-cross sensor 22Y. Sensor 22Y may be formed of an analog OP amplifier. Sensor 22Y converts the waveform of E20Y to a rectangular waveform whose level-inversion point is the circuit-ground level. A rectangular signal E22Y outputted from sensor 22Y is supplied to a waveshaper 24Y. Waveshaper 24Y may be formed of a Schmitt trigger circuit. Waveshaper 24Y improves the sharpness of the rising and falling edges of the rectangular waveform of E22Y.

An output signal E24Y from waveshaper 24Y is supplied to a ½ frequency divider 26Y. Divider 26Y divides the frequency (90 Hz–180 Hz) of E24Y by 2 and outputs a rectangular signal E26Y having frequency components of 46 Hz to 90 Hz. Divider 26Y may be formed of a T type flip-flop. Rectangular waveform of E26Y is converted by a waveform converter 28Y into a sine waveform signal E28Y which has a fixed amplitude and the same frequency as E26Y. Converter 28Y may be formed of elements 47, 48 and 50 in FIG. 1. Or, converter 28Y may have a combination of element 47 and the configuration of FIG. 20, in which E26Y is converted into a triangular waveform signal via an integration circuit (47), the triangular signal is changed to digital data via an A/D converter (62AX), the digital data is supplied as address data to a ROM (62BX) which stores linear/sine conversion data, and sine data readout from the ROM is changed via a D/A converter (62CX) and LPF (62DX) to analog sine signal E28Y.

E28Y is attenuated or amplified by a VCA 30Y. The amplification factor of VCA 30Y is determined by the potential of a control signal E60Y. Thus, E28Y is amplitude-modulated by E60Y in VCA 30Y. VCA 30Y may have the same configuration as VCA 26 or 52 in FIG. 1. E60Y is obtained from a combination of phase shifters 56Y and 58Y and an AC/DC conversion rectifier 60Y. Elements 56Y, 58Y and 60Y may have the same configuration as elements 14, 16 and 28 in FIG. 1. Namely, the combination of elements 56Y, 58Y and 60Y functions as a rectifier for generating DC signal E60Y corresponding to the amplitude of E20Y.

An output signal E30Y from VCA 30Y is phase-shifted by a phase shifter 32Y. An output signal E32Y from shifter 32Y is supplied to the first contact of a selector switch 34Y. E32Y is phase-inverted by an inverter 36Y. An output signal E36Y from inverter 36Y is supplied to the second contact of switch 34Y. E32Y or E36Y selected by switch 34Y is supplied to a potentiometer 38Y. The amplitude of E32Y or E36Y from switch 34Y is optionally adjusted by a coefficient K2 of potentiometer 38Y. Potentiometer 38Y may include a level compander whose compression or expansion degree may be controlled by E20Y, etc. Elements 32Y and 38Y of FIG. 26 may have the same configurations as elements 13X and 14X of FIG. 13.

E24Y from waveshaper 24Y is supplied to a ⅓ frequency divider 42Y. Divider 42Y divides the frequency (90 Hz–180 Hz) of E24Y by 3 and outputs a rectangular signal E42Y having frequency components of 30 Hz to 60 Hz. Divider 42Y may be formed of a modulo-3 ring counter. Rectangular waveform signal E42Y is converted by a waveform converter 44Y into a sine waveform signal E44Y which has a fixed amplitude and the same frequency as E42Y. Converter 44Y may have the same configuration as converter 28Y. E44Y is attenuated or amplified by a VCA 46Y. The amplification factor of VCA 46Y is determined by the potential of E60Y. Thus, E44Y is amplitude-modulated by E60Y in VCA 46Y. VCA 46Y may have the same configuration as VCA 30Y.

An output signal E46Y from VCA 46Y is phase-shifted by a phase shifter 48Y. An output signal E48Y from shifter 48Y is supplied to the first contact of a selector switch 50Y. E48Y is phase-inverted by an inverter 52Y. An output signal E52Y from inverter 52Y is supplied to the second contact of switch 50Y. E48Y or E52Y selected by switch 50Y is supplied to a potentiometer 54Y. The amplitude of E48Y or E52Y from switch 50Y is optionally adjusted by a coefficient K3 of potentiometer 54Y. Potentiometer 54Y may include a level compander whose compression or expansion degree may be controlled by E20Y, etc. Elements 48Y and 54Y of FIG. 26 may have the same configurations as elements 13X and 14X of FIG. 13.

An output signal E38Y from potentiometer 38Y is a 2nd harmonic distortion cancel signal, and an output signal E54Y from potentiometer 54Y is a 3rd harmonic distortion cancel signal. E38Y and E54Y are added to each other in an adder 40Y. An output signal E40Y from adder 40Y is a distortion control signal. E40Y is added in an adder 18Y to E16Y from potentiometer 16Y. Adder 18Y provides an output signal Eo containing the distortion control signal E40Y.

A typical application of the signal synthesizer shown in FIG. 26 is a nonlinearity compensation of an electric/mechanical conversion actuator (e.g., a loud speaker for sound reproduction, a record disc cutter, an ultrasonic vibrator for ultrasonic testing, etc.). For instance, the signal synthesizer of FIG. 26 may be used to cancel or reduce the 2nd and 3rd harmonic distortions caused by nonlinear motion of the diaphragm of a loud speaker. When the synthesizer of FIG. 26 is used for the above exemplified purpose, Eo from adder 18Y is supplied to a power amplifier (not shown). This power amplifier drives a loud speaker (woofer) which reproduces a distorted sound for a signal input of about 46 Hz to 90 Hz. The synthesizer cancels or reduces the degree of distortion of such a distorted sound according to E40Y (which corresponds to 2nd and 3rd harmonic distortion cancel signals E38Y and E54Y). Thus, 2nd HD (90 Hz–180 Hz) of the woofer caused by E38Y (45 Hz–90 Hz) may be cancelled or reduced by partial components (90 Hz–180 Hz) of E16Y, and 3rd HD (90 Hz–180 Hz) of the woofer caused by E54Y (30 Hz–60 Hz) may also be cancelled or reduced by partial components (90 Hz–180 Hz) of E16Y. Effective distortion cancelling is performed by a proper adjustment of potentiometers 16Y, 38Y, 54Y and phase shifters 14Y, 32Y, 48Y, and by proper selection of switches 34Y, 50Y. Changing, decreasing or increasing the distortion component of sound reproduced from the woofer is also possible by an optional adjustment of said potentiometers and phase shifters.

Figure 27:
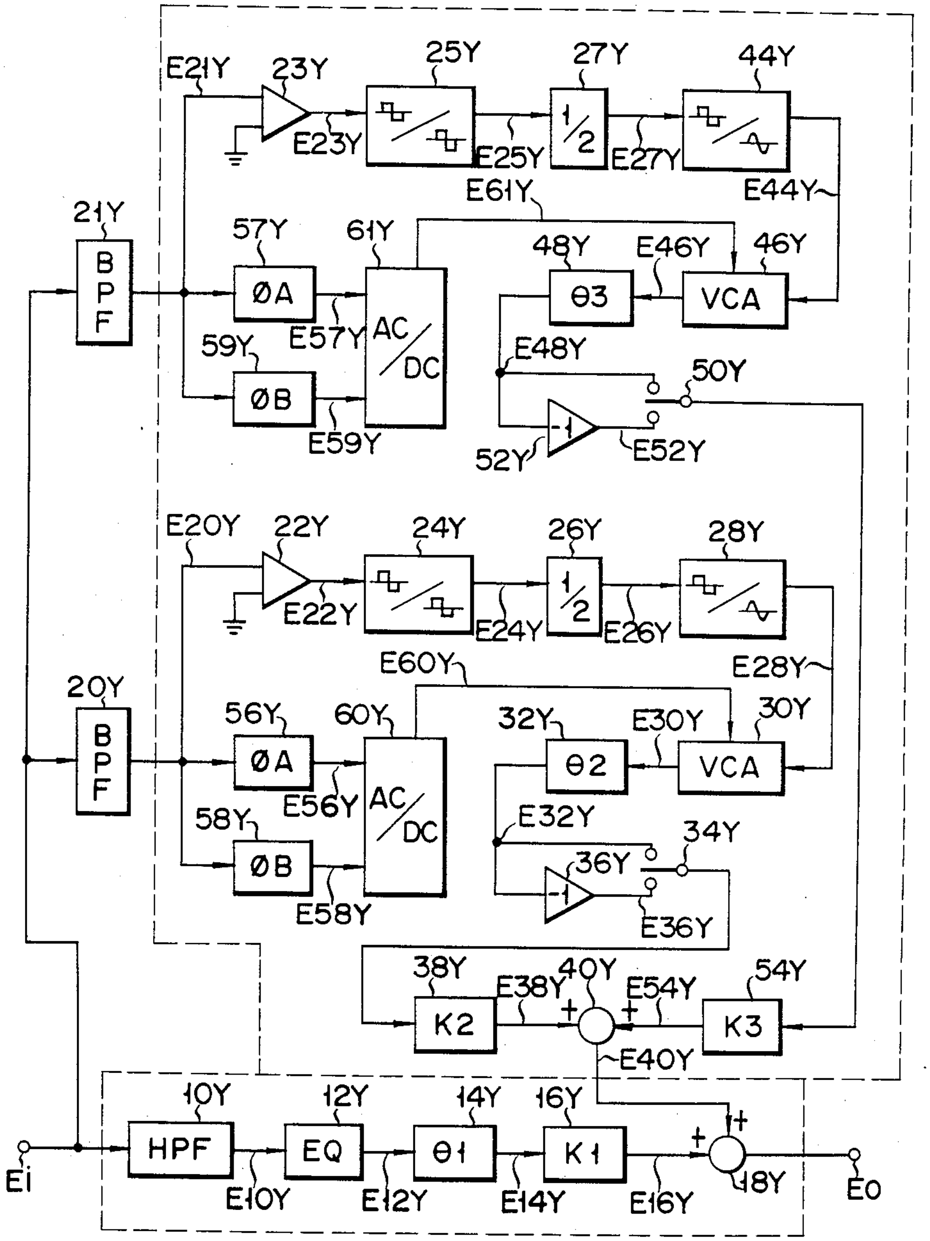
FIG. 27 shows a block configuration of a distortion synthesizer which is a modification of FIG. 26.

FIG. 27 shows a block configuration of a distortion synthesizer which is a modification of FIG. 26. In FIG. 27 a 2nd harmonic distortion cancel signal for 45 Hz to 90 Hz and another 2nd harmonic distortion cancel signal for 30 Hz to 60 Hz are synthesized.

60 Hz to 15 kHz components of Ei having a frequency range of 30 Hz to 15 kHz are supplied to an adder 18Y via elements 10Y to 16Y. An extracted signal E20Y corresponding to 90 Hz to 180 Hz components of Ei is supplied from a BPF 20Y to a zero-cross sensor 22Y. E20Y is converted to a 2nd harmonic distortion cancel signal E38Y (45 Hz to 90 Hz) via elements 22Y, 24Y, 26Y, 28Y, 30Y, 32Y, 34Y, 36Y, 38Y, 56Y, 58Y and 60Y. Even-numbered elements 10Y to 18Y, 20Y to 38Y and 56Y to 60Y may have the same configurations as those in FIG. 26.

Another extracted signal E21Y corresponding to 60 Hz to 120 Hz components of Ei is supplied from a BPF 21Y to a zero-cross sensor 23Y. E21Y is converted to another 2nd harmonic distortion cancel signal E54Y (30 Hz to 60 Hz) via elements 23Y, 25Y, 27Y, 44Y, 46Y, 48Y, 50Y, 52Y, 54Y, 57Y, 59Y and 61Y. Odd-numbered elements 21Y to 27Y and 57Y to 61Y may respectively have the same configurations as the even-numbered elements 20Y to 26Y and 56Y to 60Y, and elements 44Y to 54Y may have the same configuration as those in FIG. 26. E38Y (45 Hz-90 Hz) and E54Y (30 Hz-60 Hz) are added together in an adder 40Y. Adder 40Y provides a distortion control signal E40Y (30 Hz-90 Hz). E40Y is added to E16Y (60 Hz-15 kHz) in adder 18Y. An output signal Eo (30 Hz-15 kHz) is obtained from adder 18Y.

2nd HD of reproduced sound from a speaker (not shown), which is based on E54Y (30 Hz-60 Hz), may be cancelled or reduced by 60 Hz to 120 Hz components of E16Y. The adjustment for this cancellation may be done by elements 14Y, 16Y, 48Y, 50Y and 54Y. 2nd HD of reproduced sound from the speaker, which is based on E38Y (45 Hz-90 Hz), may be cancelled or reduced by 90 Hz to 180 Hz components of E16Y. The adjustment for this cancellation may be done by elements 14Y, 16Y, 32Y, 34Y and 38Y. Adjustment other than the distortion cancelling adjustment permits one to change or modify harmonic distortion components of the reproduced sound, or to increase the harmonic distortion (for electric musical instruments).

In the configuration of FIG. 27, when $\frac{1}{2}$ frequency dividers 26Y and/or 27Y are replaced by a modulo-N programmable counter (1/N frequency divider), cancelling, changing, decreasing or increasing of N-order harmonic distortion is possible.

Figure 28:
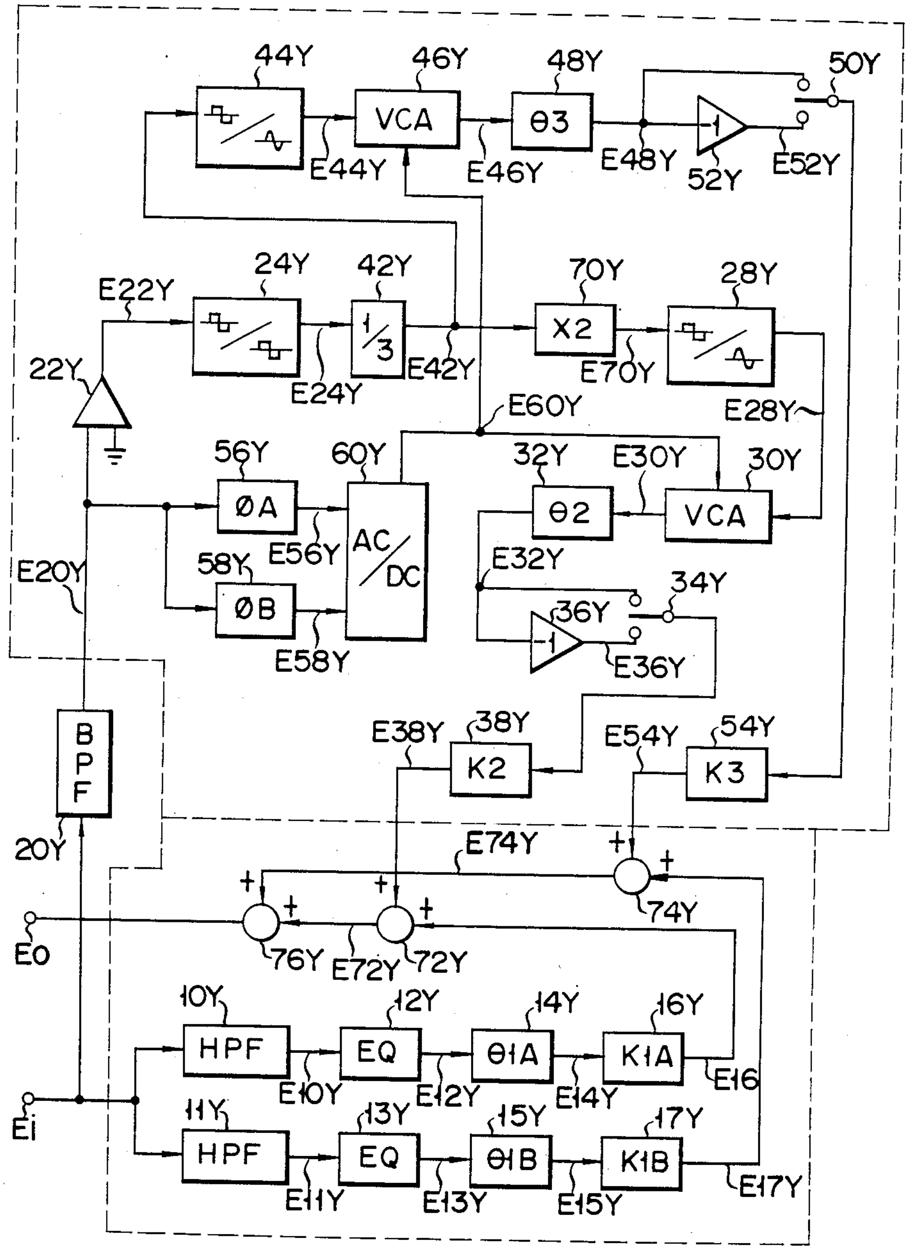
FIG. 28 shows a block configuration of a distortion synthesizer which is another modification of FIG. 26.

FIG. 28 shows a block configuration of a distortion synthesizer which is another modification of FIG. 26. In FIG. 28, 2nd and 3rd harmonic distortion cancel signals for 30 Hz to 60 Hz are synthesized.

120 Hz to 15 kHz components of Ei (30 Hz to 15 kHz) are supplied to an adder 72Y via elements 10Y, 12Y, 14Y and 16Y. 60 Hz to 15 kHz (or 60 Hz to 120 Hz) components of Ei (=E17Y) are supplied to an adder 74Y via elements 11Y, 3Y, 15Y and 17Y. (When E17Y=60 Hz to 120 Hz, element 11Y is a BPF.) E20Y corresponding to 90 Hz to 180 Hz components of Ei is supplied via a BPF 20Y to a zero-cross sensor 22Y. E20Y is converted into a $\frac{1}{3}$ frequency-divided signal E42Y (30 Hz-60 Hz) via sensor 22Y, waveshaper 24Y and $\frac{1}{3}$ frequency divider 42Y. E42Y is converted into a frequency-doubled signal E70Y (60 Hz to 120 Hz) via a frequency doubler (or multiplier) 70Y. Doubler 70Y may have the same configuration as the combination of elements 14 to 24 in FIG. 1 or the combination of elements 74 to 78 in FIG. 4. E70Y is converted into E38Y (60 Hz to 120 Hz) via elements 28Y to 38Y. Elements 28Y to 38Y may be the same as those in FIG. 26. E42Y is converted into E54Y (30 Hz to 60 Hz) via elements 44Y to 54Y. Elements 44Y to 54Y may be the same as those in FIG. 26.

Adder 72Y supplies to an adder 76Y a signal E72Y (60 Hz-15 kHz) corresponding to the sum of E16Y (120 Hz-15 kHz) and E38Y (60 Hz-120 Hz). Adder 74Y supplies to adder 76Y a signal E74Y (30 Hz-15 kHz or 30 Hz-120 Hz) corresponding to the sum of E17Y (60 Hz-15 kHz or 60 Hz-120 Hz) and E54Y (30 Hz-60 Hz). Adder 76Y (30 Hz-15 kHz) outputs Eo (30 Hz-15 kHz) corresponding to the sum of E72Y and E74Y.

The configuration of FIGS. 26 to 28 may be utilized for cancelling, modifying, increasing or decreasing the harmonic distortions of speakers (woofer, squeaker, tweeter, etc.) or for decreasing harmonic distortions of an analog tape recorder. A typical application of FIGS. 26 to 28 is a musical instrument amplifier for an electric base, organ, music synthesizer, or the like.

The signal mixing operation in adder 18Y, 40Y, 72Y, 74Y or 76Y (FIGS. 26-28) may be acoustic. For instance, a woofer or deep-bass speaker may be driven according to E40Y, and a squeaker or mid-bass speaker may be driven according to E16Y. In this case, 2nd and/or 3rd harmonic distortion components of bass-range sound generated from the woofer can be acoustically cancelled, modified, increased or decreased by mid-range sound generated from the squeaker.

Figure 29:
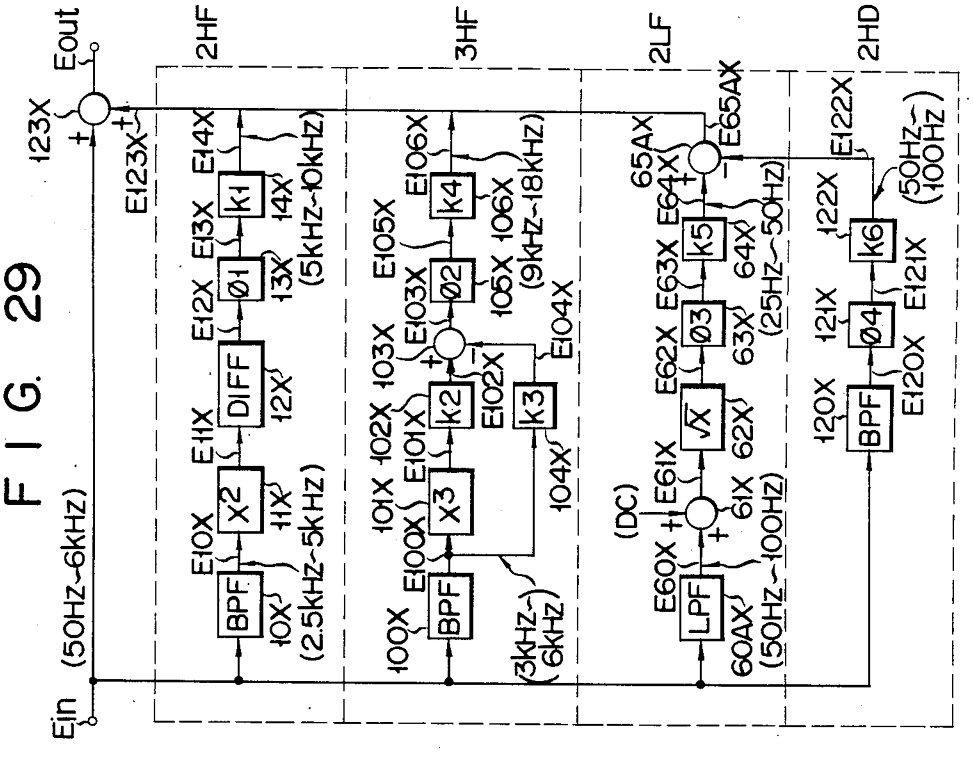
FIG. 29 shows a block configuration of a signal synthesizer which is another embodiment of the invention, wherein signal synthesizers in FIGS. 13, 18 and 24 are combined with a distortion synthesizer.

FIG. 29 shows a block configuration of a signal synthesizer which is another embodiment of the invention, wherein signal synthesizers in FIGS. 13, 18 and 24 are combined with a distortion synthesizer.

In FIG. 29 a 2nd harmonic synthesizer portion 2HF (FIG.13) synthesizes E14X (5 kHz-10 kHz) from 2.5 kHz to 5 kHz components of Ei. A differentiation circuit 12X of FIG. 29 corresponds to capacitor 12X of FIG. 13 and performs the differentiating operation dE11X/dt. When the differentiating time constant of circuit 12X is sufficiently small, circuit 12X produces $-w \sin wt$ (E12X) from $\cos wt$ (E11X). An equalizer having a proper frequency characteristic and/or a phase inverter may be provided between circuit 12X and phase shifter 13X as the case may require.

A 3rd harmonic synthesizer portion 3HF (FIG. 24) synthesizes E106X (9 kHz-18 kHz) from 3 kHz to 6 kHz components of Ei. The coefficients (attenuation or amplification degrees) of potentiometers 102X and 104X may be adjustable in order to obtain an optional waveform of E106X.

A $\frac{1}{2}$ order lower harmonic synthesizer portion 2LF (FIG. 18) synthesizes E64X (25 Hz-50 Hz) from 50 Hz to 100 Hz components of Ei. A low frequency distortion synthesizer portion 2HD extracts 50 Hz to 100 Hz components from Ei via a BPF 120X. An extracted signal E120X from BPF 120X is phase-shifted by a given degree by a phase shifter 121X. The amplitude of a phase-shifted signal E121X (50 Hz-100 Hz) from shifter 121X is properly adjusted by a potentiometer 122X. An amplitude-adjusted signal E122X from potentiometer 122X is subtracted from (or added to) E64X in a subtracter (or adder) 65AX. E122X (50 Hz-100 Hz) is utilized for, e.g., cancelling a 2nd harmonic distortion of sound which is generated, according to E64X (25 Hz-50 Hz), from a speaker (not shown).

Subtracter 65AX outputs a signal E65AX (25 Hz-100 Hz) corresponding to E64X-E65AX. E14X, E65AX and E106X are added to Ei in an adder 123X. Adder 123X produces from a narrow range signal Ei (50 Hz-6 kHz) a wide range signal Eo (25 Hz-18 kHz) containing distortion control signal E122X.

Figure 30:
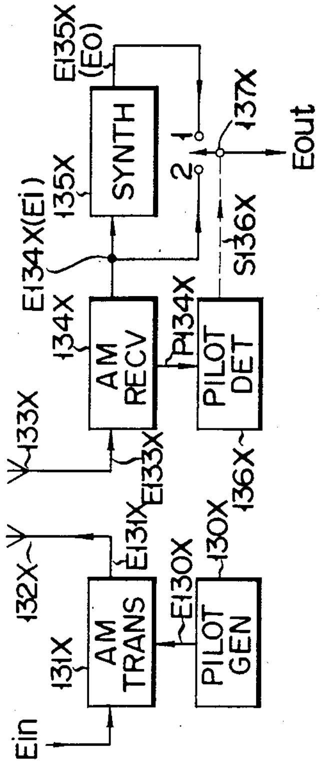
FIG. 30 is a block diagram showing the configuration of an AM radio transmission/reception system, which is another application of the invention.

FIG. 30 is a block diagram showing the configuration of an AM radio transmission/reception system, which is one application of the signal synthesizer according to the invention.

A wide range input signal Ein (e.g., 25 Hz-16 kHz) is supplied as a modulation input to an AM transmitter 131X. Transmitter 131X receives a pilot signal E130X (e.g., 10 Hz) from a pilot generator 130X. Transmitter 131X supplies to a transmission antenna 132X and AM radio signal E131X whose carrier (e.g., 1 MHz) is amplitude-modulated by the composite signal of Ein and E130X. When the radio wave transmitted from antenna 132X is caught by a reception antenna 133X, antenna 133X provides to an AM receiver 134X a radio signal E133X corresponding to E131X. Receiver 134X may comprise a superheterodyne AM tuner and a filter circuit for frequency-separating the pilot signal E130X from Ein. Receiver 134X supplies a signal E134X (e.g., 50 Hz–4 kHz/−3 dB and 25 Hz–8 kHz/−12 dB) to a signal synthesizer 135X and supplies a signal P134X (10 Hz) to a pilot detector 136X. E134X and P134X correspond to Ein and E130X, respectively. Synthesizer 135X may have any configuration of FIGS. 1, 4, 9 to 11 and 13 to 29. When synthesizer 135X has the configuration of FIG. 1, E134X corresponds to E100. Synthesizer 135X synthesizes a signal E200 (50 Hz–16 kHz/−3 dB) or a signal E300 (25 Hz–16 kHz/−3 dB). E200 or E300 is outputted as a wide range synthesized output E135X.

E135X is supplied to the first contact of an analog selector switch 137X. The second contact of switch 137X receives E134X. An output signal Eout selected by switch 137X is supplied to a power amplifier (not shown) for driving a speaker. The selection of switch 137X is controlled by a switch instruction signal S136X from detector 136X. Or, switch 137X may be manually changed. Detector 136X may comprise a BPF having a large selectivity Q for extracting only a signal component of 10 Hz and a level comparator for comparing the level of 10 Hz signal from the BPF with a given reference level. When detector 136X detects P134X (10 Hz) having a signal level larger than the given reference level, detector 136X provides S136X having, e.g., a logic "1" level so that switch 137X selects E135X (25 Hz–16 kHz/−3 dB). When detector 136X does not detect such P134X (10 Hz), detector 136X provides S136X having, e.g., a logic "0" level so that switch 137X selects E134X (50 Hz–4 kHz/−3 dB).

According to the configuration of FIG. 30, when the AM broadcasting station (130X–132X) transmits a music source (Ein) with the pilot signal E130X, the AM receiver side (133X–137X) automatically expands the frequency range of E134X to provide a wide range output Eout (25 Hz–16 kHz/−3dB). When the AM broadcasting station (130X–132X) transmits a news source (Ein) without E130X, the AM receiver side (133X–137X) provides a narrow range output Eout (50 Hz–4 kHz/−3dB).

The configuration of FIG. 30 may be applied to an FM, TV or wired broadcasting system or telephone network, or it may be utilized to a music source recording/reproducing system (tape, disc, etc.).

Figure 31:
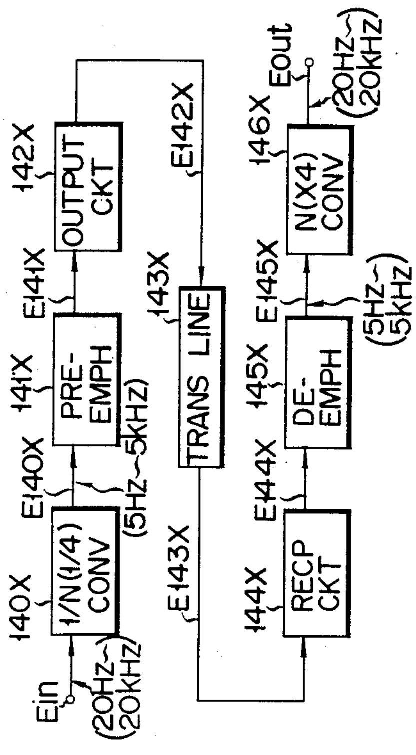
FIG. 31 is a block diagram showing the configuration of a signal transmission/reception system in which a wide frequency range signal Ein is transmitted via a narrow range signal transmission line 143X, which is another application of the invention.

FIG. 31 is a block diagram showing the configuration of a signal transmission/reception system in which a wide frequency range signal Ei is transmitted via a narrow range signal transmission line 143X, which is another application of the signal synthesizer according to the invention.

A wide range input Ein (20 Hz—20 kHz) is supplied to a 1/N pitch converter (analog frequency divider) 140X. When N=4, converter 140X provides a converted signal E140X (5 Hz—5 kHz) whose frequency spectrum is shifted to a lower frequency side. Converter 140X may be formed of two cascade-connected synthesizer units, each of the units having a configuration corresponding to, e.g., FIG. 18, provided that BPF 60X, adder 65X and the signal line from Ei to 65X are omitted (i.e. Ei=E60X=input, and E64X=Eo=output). E140X is supplied to a pre-emphasis equalizer 141X. Equalizer 141X boosts the higher frequency component of E140X and provides an equalized output signal E141X. E141X is supplied to a transmission output circuit 142X which may include an LPF for eliminating signal components higher than 5 kHz.

Circuit 142X supplies a signal transmission line 143X with a transmission output E142X, with a prescribed line impedance and a given line level. Line 143X includes, e.g., a long signal transmission cable through which signal components far higher than 5 kHz are prominently decreased while 5 Hz to 5 kHz components can be transmitted with a small loss.

A signal E143X (5 Hz—5 kHz) transmitted via line 143X from circuit 142X is inputted to a reception circuit 144X. The input impedance of circuit 144X is matched with the line impedance of line 143X. Circuit 144X may be provided with a squelch or muting circuit so that circuit 144X is insensitive to excessively small and noisy input signals. An output signal E144X from circuit 144X is supplied to a de-emphasis equalizer 145X. Equalizer 145X reduces the higher frequency component of E144X and provides an equalized output signal E145X. E145X is supplied to an N pitch converter (analog frequency multiplier) 146X. When N=4, converter 146X provides a converted signal Eout which has a frequency spectrum (20 Hz—20 kHz) being substantially equal to the frequency spectrum of Ei. Converter 146X may be formed of two cascade-connected synthesizer units, each of the units having a configuration corresponding to, e.g., FIG. 14, provided that BPF 20X, adder 26X and the signal line from Ei to 26X are omitted (i.e. Ei=E20X=input, and E25X=Eo=output).

When the configuration of low-frequency synthesizer part 200 in FIG. 1 is utilized to constitute $\frac{1}{2}$ (N=2) pitch converter 140X and the configuration of high-frequency synthesizer part 100 in FIG. 1 is utilized to constitute x 2 (N=2) pitch converter 146X, control signal E58 of part 200 (140X) may be transmitted to part 100 (146X) separately from the signal component of Ein. For instance, the DC potential of E58 is changed to an AC signal via a VCO (not shown). The frequency of this AC signal is, e.g., 10 kHz. This 10 kHz signal is transmitted via transmission line 143X (or via any other transmission line) to converter 146X. In converter 146X the 10 kHz signal is extracted by a BPF and the frequency of the extracted 10 KHz signal is converted to E28 via a F/V converter (not shown). In this case the converted E28 is supplied to VCA 26 of part 100 and elements 14, 16 and 28 may be omitted.

Figure 32:
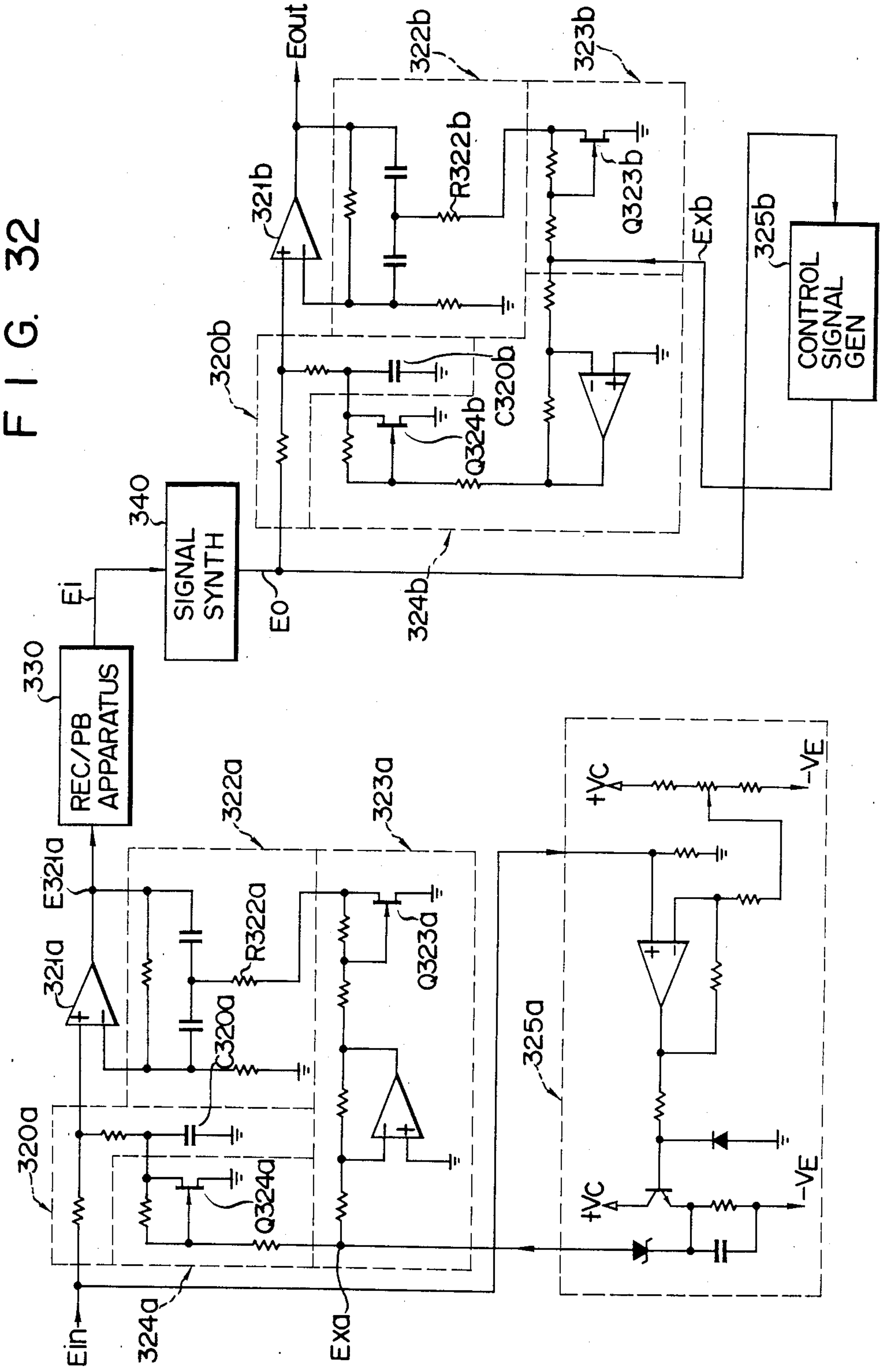
FIG. 32 is a circuit diagram showing the configuration of a signal recording/playback system in which the recording/playback equalizing characteristics are varied with the level change of recording/playback signals, which is another application of the invention.

FIG. 32 is a circuit diagram showing the configuration of a signal recording/playback system in which the recording/playback equalizing characteristics are varied with the level change of recording/playback signals, which is another application of the signal synthesizer according to the invention.

A recording input signal Ein is supplied via a low-frequency equalizing circuit **320*a* to the noninverted input of a recording amplifier 321*a*. The negative feedback loop of amplifier 321*a* includes a bridge-T CR network 322*a* for high-frequency equalizing. Amplifier 321*a*** outputs a low/high boosted signal E321*a*. A center branch resistor R322*a* of network **322*a*** is circuit-grounded via an FET Q323*a* of a variable resistance circuit **323*a*. Circuit 320*a*** is provided with a capacitor C320*a* for low-frequency range boosting. An FET Q324*a* of a variable resistance circuit 324*a* is connected in parallel to capacitor C320*a*. Inner resistances of FETs Q323*a* and Q324*a* are controlled by a control signal Exa, such that the resistance of Q323*a* increases and that of Q324*a* decreases as the potential of Exa rises. Thus, the boosting amount of low and high frequency ranges are decreased by the potential rise of Exa. Exa is obtained from a control signal generator 325*a* which receives Ein. Generator 325*a* rectifies Ein and generates Exa whose DC potential corresponds to the amplitude of Ein. Generator 325*a* may be formed of elements 14, 16 and 28 in FIG. 1.

E321*a* is supplied to a recording/playback apparatus 330. Apparatus 330 may be a conventional tape recorder. A playback output signal Ei from apparatus 330 is supplied to a signal synthesizer 340. Synthesizer 340 may have any of the illustrated configuration (e.g., FIG. 1 or 29). Synthesizer 340 compensates for a poor frequency response of apparatus 330, so that a synthesized output Eo from synthesizer 340 has a wide frequency range.

Eo is supplied via a low-frequency equalizing circuit 320*b* to the noninverted input of a playback equalizing amplifier 321*b*. The negative feedback loop of amplifier 321*b* includes a bridge-T CR network 322*b for high-frequency equalizing. Amplifier 321b* outputs a low/high boosted signal Eout. A center branch resistor R322*b* of network 322*b* is circuit-grounded via an FET Q323*b* of a variable resistance circuit 323*b*. Circuit 320*b* is provided with a capacitor C320*b* for low-frequency range boosting. An FET Q324*b* of a variable resistance circuit 324*b* is connected in parallel to capacitor C320*b*. Inner resistances of FETs Q323*b* and Q324*b* are controlled by a control signal Exb, such that the resistance of Q323*b* decreases and that of Q324*b* increases as the potential of Exb rises. Thus, the boosting amount of low and high frequency ranges are incresed by the potential rise of Exb. Exb is obtained from a control signal generator 325*b* whose configuration may be the same as the configuration of generator 325*a*. Generator 325*b* rectifies Eo and generates Exb whose DC potential corresponds to the amplitude of Eo.

The bridge-T circuit 322*a* and/or 322*b* may be replaced by an LC circuit, a semiconductor LC circuit utilizing a bootstrap, a twin-T circuit, etc.

The configuration of FIG. 32 is disclosed in detail in the Japanese Patent Application No. 55-54012, the inventor of which is the same as the present invention. All disclosure of this Japanese Patent Application are incorporated in the present application.

In the embodiments wherein sine and cosine signals are used, the relation "$\sin^2 x + \cos^2 x = 1$" may be utilized to obtain a sin x signal from a cos x signal, or to obtain a cos x signal from a sin x signal (e.g., $\sin x = \sqrt{1 - \cos^2 x}$ may be utilized.).

The present invention should not be limited to the embodiments disclosed herein. Various changes, modifications or applications of the embodiments may be made within the scope of the claimed invention. The present invention is generally applicable to analog signal treating systems of various fields, and not limited only to an audio signal treating system. For instance, the synthesizer of this invention may be utilized to constitute a graphic equalizer in which the frequency response of each prescribed frequency range is changed according to the concept of the present invention.

What is claimed is:

1. A signal synthesizer, comprising:

a high frequency synthesizer part including frequency increase means for increasing a prescribed frequency of a specific signal component to a frequency of a converted signal, said high frequency synthesizer part comprising first extractor means, responsive to an input signal containing various analog signal components, for extracting from the input signal said specific signal component having said prescribed frequency and unfixed amplitude;

first converter means, coupled to said first extractor means, for converting said specific signal component into a converted signal so that the frequency of said converted signal corresponds to but is higher than the frequency of said specific signal component, and the amplitude of said converted signal is modulated by the amplitude of said specific signal component;

said first converter means including means for modulating the amplitude of said converted signal according to the amplitude of said specific signal component; and mixer means, coupled to said first converter means and responsive to said input signal, for mixing said converted signal with said input signal to provide an output signal whose frequency spectrum covers the frequency spectra of said converted signal and said input signal.

2. A synthesizer according to claim 1, wherein said mixer means includes means for phase-shifting said input signal to provide an intermediate signal which is to be mixed with said converted signal.

3. A synthesizer according to claim 2, wherein said phase-shifting means includes means, responsive to said input signal, for varying the phase difference between said input signal and said intermediate signal according to the amplitude of said specific signal component.

4. A synthesizer according to claim 1, wherein said converter means includes frequency-multiplier means for multiplying the frequency of said specific signal component to generate a frequency-multiplied component; and means for filtering-off said frequency-multiplied component to provide said converted signal.

5. A signal synthesizer according to claim 1, comprising:

second extractor means, responsive to a second input signal containing various analog signal components, for extracting from the second input signal a second specific signal component having a prescribed frequency and unfixed amplitude;

second converter means, coupled to said second extractor means and responsive to the frequency and amplitude of said second specific signal component, for converting said second specific signal component into a second converted signal so that the frequency of said second converted signal corresponds to but is lower than the frequency of said second specific signal component, and the amplitude of said second converted signal is modulated by the amplitude of said second specific signal component, the frequency ratio between said second specific signal component to said second converted signal being an integer; and second mixer means, coupled to said converter means, for mixing said second converted signal with said second input signal to provide a second output signal, the frequency spectrum of said second input signal covering the frequency spectrum of harmonics of said second converted signal.

6. An AM radio receiver having the signal synthesizer of claim 1.

7. A broadcasting system utilizing the signal synthesizer of claim 1, comprising:

a broadcasting station being provided with a pilot signal generator for generating a pilot signal, said broadcasting station transmitting a radio wave of a given frequency, said radio wave containing information of an program source of the broadcasting and optionally containing information of said pilot signal;

a radio receiver for receiving the radio wave from said broadcasting station and providing a demodulated signal containing the information of said program source, said demodulated signal also containing the information of said pilot signal when said radio wave contains the information of said pilot signal, said demodulated signal being supplied as the input signal to said signal synthesizer which provides an output signal corresponding to the input signal, said radio receiver being provided with:

a pilot signal detector for detecting from said demodulated signal a signal component of said pilot signal, and generating a selection signal corresponding to said signal component when said demodulated signal contains the information of said pilot signal; and a selector switch coupled to said radio receiver, said signal synthesizer and said pilot signal detector, for selecting either said demodulated signal or said output signal according to said selection signal, and providing a selected output signal which is used for reproducing the program source of said broadcasting station.

8. A signal transmission system utilizing the signal synthesizer of claim 5, comprising:

transmitter means, including the combination of said second extractor means, said second converter means, and said second mixer means, for converting the frequency spectrum of an input source signal corresponding to said second input signal into a first frequency spectrum which is different from the input signal frequency spectrum, and providing a transmission signal having said first frequency spectrum;

a signal transmission line, coupled to said transmitter means and having a frequency characteristic being adapted to said first frequency spectrum, for transmitting said transmission signal and providing a transmitted signal whose frequency spectrum is substantially equal to said first frequency spectrum; and reception means, coupled to said signal transmission line and including the combination of said first extractor means, said first converter means, and said first mixer means, for converting the frequency spectrum of said transmitted signal into a second frequency spectrum which is substantially equal to the frequency spectrum of said input source signal, and providing an output source signal corresponding to said output signal having said second frequency spectrum.

* * * * *